United States Patent [19]

Dlugos et al.

[11] Patent Number: 4,535,419
[45] Date of Patent: Aug. 13, 1985

[54] SYSTEM AND METHOD FOR COMPUTING FRACTIONAL POSTAGE VALUES

[75] Inventors: Daniel F. Dlugos, Huntington; Edward P. Daniels, Bridgeport, both of Conn.

[73] Assignee: Pitney Bowes Inc., Stamford, Conn.

[21] Appl. No.: 436,122

[22] Filed: Oct. 22, 1982

[51] Int. Cl.³ ............................................. G06F 1/00
[52] U.S. Cl. .................................. 364/900; 364/464; 364/466; 177/25
[58] Field of Search ... 364/200 MS File, 900 MS File, 364/464, 466; 177/25

[56] References Cited

U.S. PATENT DOCUMENTS

| | | | |
|---|---|---|---|
| 4,271,470 | 6/1981 | Dlugos et al. | 364/200 |
| 4,286,325 | 8/1981 | Dlugos et al. | 364/900 |
| 4,308,579 | 12/1981 | Dlugos | 364/200 |
| 4,320,461 | 3/1982 | Dlugos | 364/900 X |

Primary Examiner—Raulfe B. Zache
Attorney, Agent, or Firm—Robert H. Whisker; William D. Soltow, Jr.; Albert W. Scribner

[57] ABSTRACT

A postage value computing system includes both apparatus and a method for determining the postage of an article to be mailed for various domestic and international classes of postal service. Postal information such as carrier type, class and destination data are introduced into the system and used to access a memory which stores common structured rate data. Major rate structures are defined by weight headers which specify the upper and lower limits of weight ranges and the weight increments within those ranges. To minimize memory requirements, foreign countries are grouped as a function of such common structured rate data including permissible weight limits. Memory space is conserved through the utilization of a common postage computation routine including various equation subroutines for generating requisite postage values in accordance with the retrieved postage rate data. Rate structures include additional data which defines the decimal point location in postage values determined in accordance with that rate structure whereby the system can handle postage values expressed in fractions of the smallest unit of currency.

13 Claims, 34 Drawing Figures

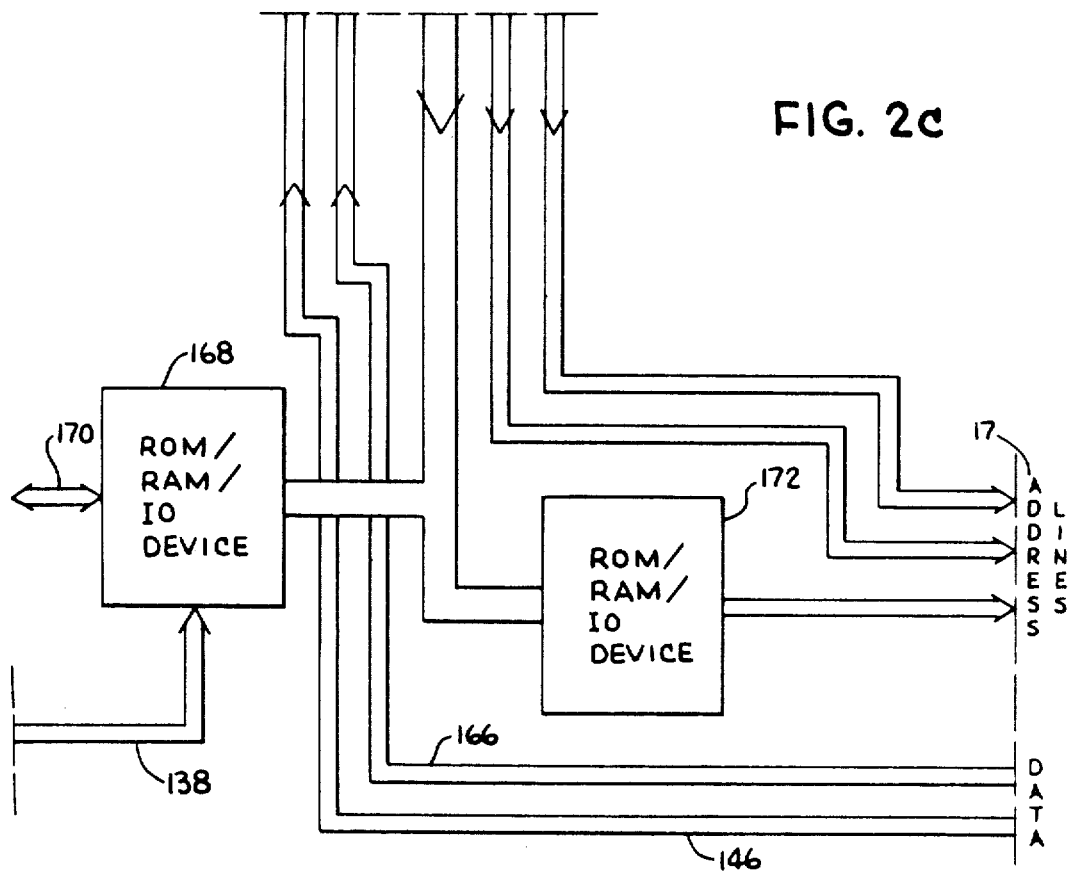
FIG. 2c
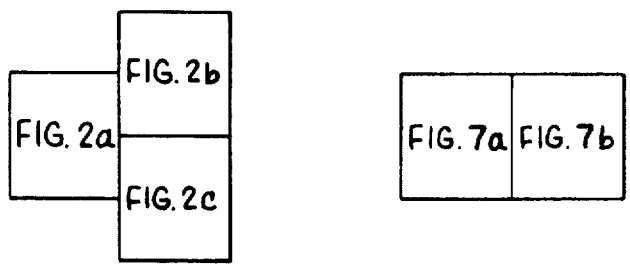
FIG. 3
FIG. 8

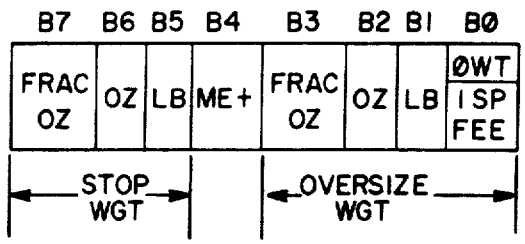

Fig. 11

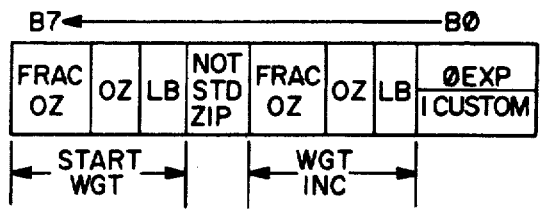

Fig. 12

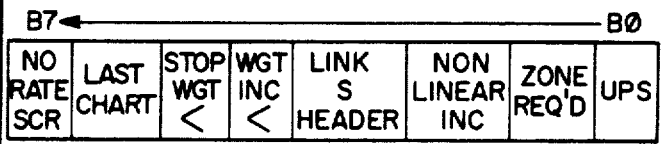

Fig. 13

| B7 | 6 | 5 | 4 | 3 | 2 | 1 | B0 |
|---|---|---|---|---|---|---|---|
| WGT FLAG 1 ||||||||
| WGT FLAG 2 ||||||||
| WGT FLAG 3 ||||||||
| SPECIAL FEE MASKS ||||||||
| VECTOR TO CUSTOM ILL ZIPS HI ||||||||
| VECTOR TO CUSTOM ILL ZIPS LO ||||||||
| VECTOR TO CUSTOM ZIPS HI ||||||||
| VECTOR TO CUSTOM ZIPS LO ||||||||
| STOP WEIGHT ⋮ ||||||||
| NEXT CHART ADDRESS ||||||||
| OVERSIZE WEIGHT ⋮ ||||||||
| START WEIGHT ⋮ ||||||||
| WGT INC #1 ⋮ ||||||||
| WGT INC #2 ⋮ ||||||||
| WGT INC #3 ⋮ ||||||||
| WGT DELIMITER ||||||||
| MAX ZONE = ||||||||
| ZONE 0 $ TABLE ADDRESS ||||||||
| ZONE 1 $ TABLE ADDRESS ||||||||
| ZONE n $ TABLE ADDRESS ||||||||
| $ TABLE HEADER ||||||||

Fig. 10

| SYSTEM DIRECTORY TABLE | UPS RATE STRUCTURE |
|---|---|
| U.S. POSTAL SERVICE RATE STRUCTURE | INTERNATIONAL MAIL RATE STRUCTURE |

| B7 B6 B5 B4 B3 B2 B1 B0 |
|---|
| L \| TABLE INCREMENT COUNT |
| ADDRESS OF NEXT $ TABLE |
| $ FLAG |
| ROUNDING BYTE |
| $ START AMOUNT |
| INCREMENT #1 ⋮ |
| INCREMENT #2 ⋮ |
| INCREMENT #n ⋮ |

Fig. 16

| |
|---|
| WEIGHT HEADER RANGE #1 STOP WEIGHT |
| $ TABLE ZONES 0-8 WEIGHT RANGE #1 |
| WEIGHT HEADER RANGE #2 STOP WEIGHT |
| $ TABLE ZONES 0-8 WEIGHT RANGE #2 |
| WEIGHT HEADER RANGE #3 STOP WEIGHT |
| $ TABLE ZONES 0-8 WEIGHT RANGE #3 |

Fig. 17

| |
|---|
| WEIGHT HEADER-ALL ZONES WEIGHT FLAGS STOP WEIGHT WEIGHT INCREMENT MAX ZONE # ZONE 0 $ TABLE ADD ZONE 1 $ TABLE ADD ⋮ |
| ZONE 0 $ TABLES |
| # INCREMENTS IN SEC.1 |
| SEC. 2 ADDRESS |
| $ START AMT (SEC.1) |
| $ INCREMENT (SEC.1) |
| # INCREMENTS IN SEC. 2 |
| SEC. 3 ADDRESS |
| $ START AMT (SEC.2) |
| $ INCREMENTS (SEC.2) |
| ZONE 8 $ TABLES |
| # INCREMENTS IN SEC.1 |
| SEC. 2 ADDRESS |
| $ START AMT (SEC.1) |
| $ INCREMENT (SEC.1) |

Fig. 15

| B7 | B6 | B5 | B4 | B3 | B2 | B1 | B0 |
|---|---|---|---|---|---|---|---|
| START FRAC ¢ | START $ | INC FRAC ¢ | START HUND $ | INC $ | RND UP | RND OFF | NON-LIN INC |

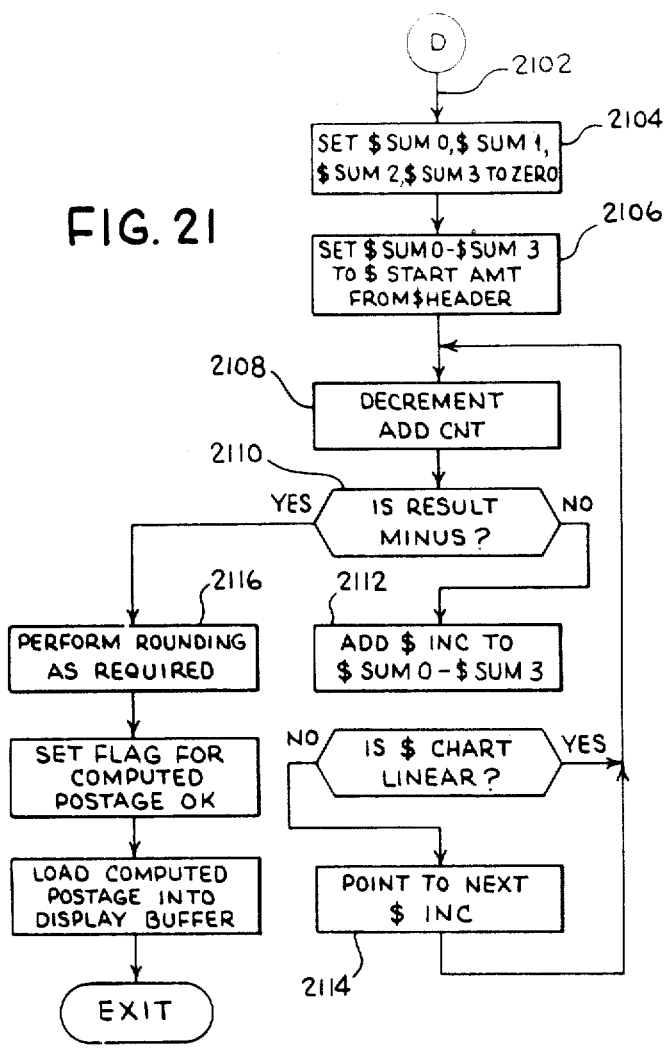
FIG. 21
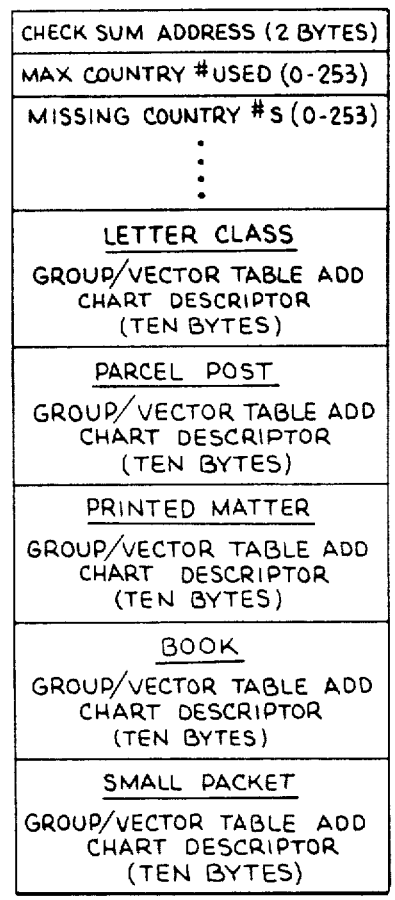
FIG. 22
FIG. 23

SYSTEM AND METHOD FOR COMPUTING FRACTIONAL POSTAGE VALUES

BACKGROUND OF THE INVENTION

The subject invention relates to an apparatus and method for determining postage and more particularly to postage meter systems incorporating such apparatus and method.

Sophisticated system for determining applicable postage for items to be mailed exist. Typically such systems comprise a scale for determining the weight of an item to be mailed, a keyboard for entering data necessary to determine the applicable postage in accordance with the weight and entered data for each item to be mailed. One such apparatus is described in U.S. Pat. No. 4,286,325, to Dlugos, et al., for SYSTEM AND METHOD FOR COMPUTING DOMESTIC AND INFORMATIONAL POSTAGE, filed Aug. 27, 1979, which is hereby incorporated by reference.

Though such apparatus have proven to be highly adaptable, having the capability to handle numerous classes of service and being readily modified to deal with changing postal rates such systems have heretofore lacked the capability to deal with postage values expressed in fractions of the smallest unit of currency. (It should be noted that prior art apparatus could deal with fractional rate increments. Thus a postage rate of 19½ cents per ounce would have been within the capability of the prior art systems but the final postage value would have had to have been expressed in terms of whole cents.) However, it has now become apparent that a need exists for postage meter systems capable of handling fractional cents postage values. For example it is anticipated that the U.S. Postal Serivce may allow bulk mailers a ½ cent discount on bulk mail pre-sorted by zip code. In the prior art such a need could be handled to a limited extent by storing fractional cent postage values increased by a factor of 10 in the processor. A postage meter with fractional cents capability could then be connected to the system with the 0.1 cents meter input connected to the 1 cent processor output and the other meter inputs connected accordingly.

While useful to some extent the approach taken in the prior art to handle fractional cent postage values suffered from certain disadvantages. Thus the postage value displayed to the system operator of such a prior art system might be ten times too large. Similarly such systems could not include postage accounting subsystems since such subsystems would receive erroneous data whenever a postage value expressed in fractions of a cent was determined. And of course postage values expressed in whole units could no longer be determined with the same number of significant digits. However, the systems of the prior art did have one major advantage. Since a postage meter is in effect a machine for spending money, reliability of operation, and confidence in that reliability, are of the utmost importance. Thus it was an important feature of the prior art that postage values expressed in fractions of a cent could be handled in the manner described above with minimal changes in what was a well tested, highly reliable, well excepted system.

Thus it is an object of the subject invention to provide an apparatus for determining postage values expressed in fractions of the smallest unit of currency and outputting and displaying such values in a consistant manner.

It is another object of the subject invention to this while retaining the highest possible degree of confidence in the reliability of the apparatus.

It is another object of the subject invention to provide an apparatus which is capable of determining postage values expressed in fractions of the smallest unit of currency for some classes of postal service while, for other classes of postal service, determining postage values expressed in whole units with the same precision.

BRIEF SUMMARY OF THE INVENTION

The above objects are achieved and the disadvantages of the prior art are overcome in the present invention by means of an apparatus comprising a scale for determining the weight of items to be mailed and a data entry device, such as a keyboard, for entering data necessary to determine the postage applicable to each item. A data processor is operatively associated with the scale and the data entry device for determining the postage applicable to each item to be mailed. The data processor includes a memory for storing tables of data defining applicable postage rates, each table corresponding to a particular class of postal service. Each table also includes additional data more precisely defining the postage rate defining data in that table; the additional data including data defining the decimal point location in the postage values determined from that table. The data processor responds to the determined weights and the entered data to select and output the appropriate postage value from the tables for each item to be mailed.

A postage meter's system in accordance with the subject invention would further include a printing device for printing postage indicia, and would operate in accordance with a method comprising the steps of first determining the weight of an item to be mailed and inputting the weight determined to a data processor. Other necessary data, including data necessary to define the class of postal service applicable to the item is also input to the data processor. The data processor then identifies a table of data for determining postage rates corresponding to the applicable class of service and retrieves additional data further defining the rate defining data, the additional data including data defining the decimal point location in postage values determined in accordance with that table. The data processor then determines the postage value applicable to the item in accordance with the weight, the entered data and the identified table, the decimal point location in the determined postage value being defined by the addition data, and outputs the determined value to the printing device, whereby the appropriate postage value is applied to the item to be mailed.

Thus the subject invention advantangeously supplies an apparatus for determining postage applicable to items to be mailed where postage values may be expressed in terms of fractions of the smalles unit of currency for some classes of postal service and where postal values are output consistently whether or not expressed in fractions of such unit and where reliability and confidence are maintained at a high level.

Other objects and advantages of the subject invention will be apparent to those skilled in the art from upon consideration of the attached drawings and the Detailed Description of a Preferred Embodiment set forth below.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 3 illustrates the proper orientation of FIGS. 2a, 2b and 2c;

FIG. 8 illustrates the proper orientation of FIGS. 7a and 7b;

FIG. 9 is a memory map showing the major rate structures used in calculating domestic and international postage amounts;

FIG. 10 is a schematic representation of a weight header stored for various rate structures in memory;

FIG. 11 is a schematic representation of WGT FLAG 1 in the weight header;

FIG. 12 is a schematic representation of WGT FLAG 2 in the weight header;

FIG. 13 is a schematic representation of WGT FLAG 3 in the weight header;

FIG. 14 is a schematic representation of the format in which financial data is stored for the various rate structures;

FIG. 15 is a schematic representation of a dollar FLAG which appears in each dollar table;

FIG. 16 is a schematic representation of a type of rate structure format referred to as normal or unlinked format;

FIG. 17 is a representation of a linked format;

FIGS. 18 through 21 taken together, are a flow chart of the postage computation routine which is employed in calculating both domestic and international postage amounts;

FIG. 22 is a representation of a directory table, which is a portion of the international mail rate structure;

FIG. 23 is a more detailed representation of one set of entries in the international directory table;

DESCRIPTION OF PREFERRED EMBODIMENT OF THE INVENTION

Figure 1:
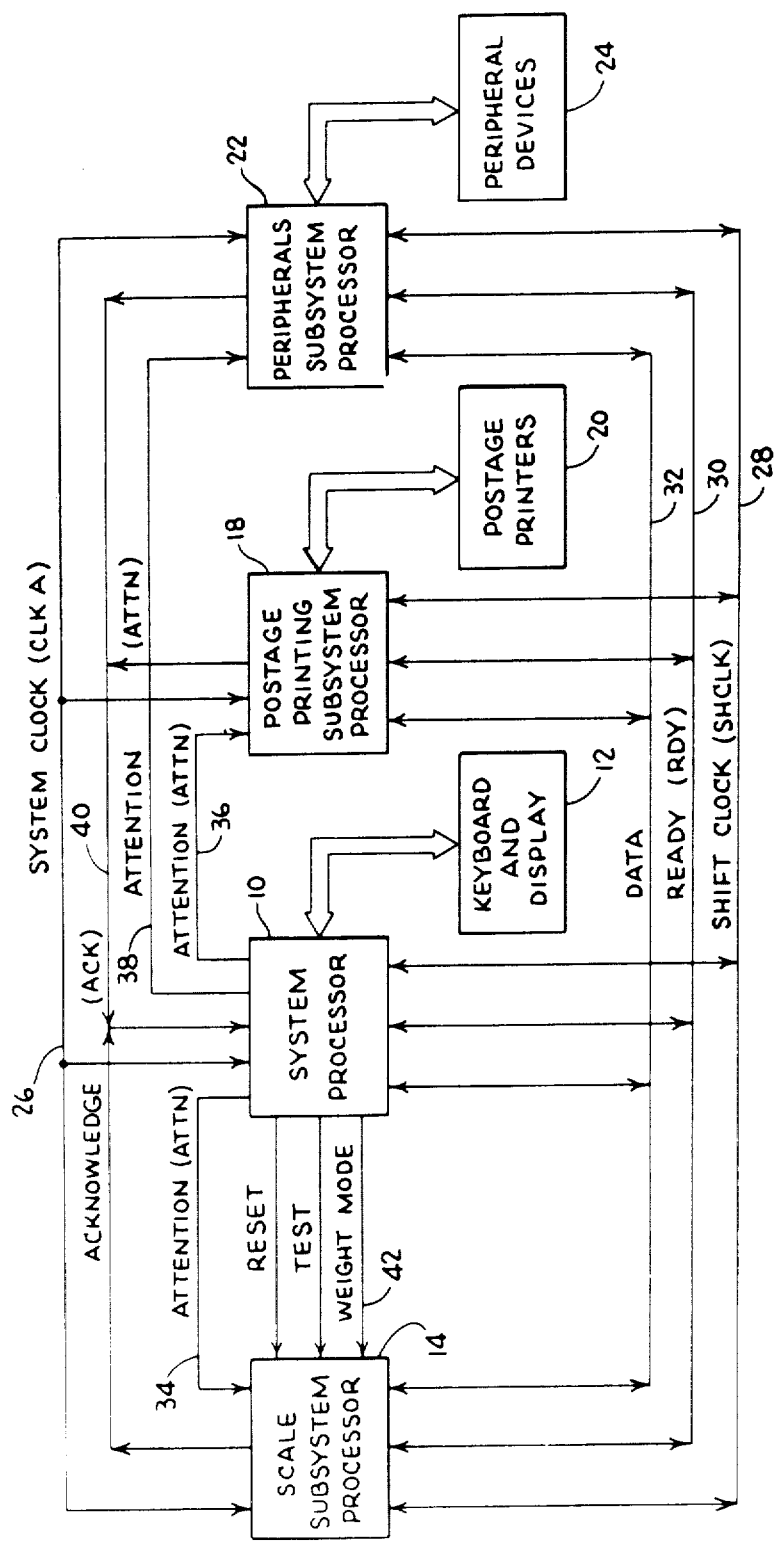
FIG. 1 is a block diagram of the major components of a multi-processor system in accordance with the present invention.

Referring to FIG. 1, the central component of the multiprocessor parcel postage metering system shown there is a system processor 10 which interfaces with a system user through an input/output subsystem 12 including a keyboard and a visual display. In a preferred embodiment of the invention, the keyboard is used to enter data concerning class of service, destination zone or country of destination, special fees and the like. In one embodiment of the invention, the first three digits of the zip codes for the point of origin and point of destination of a Parcel may be entered through the keyboard. A zip-to-zone subroutine programmed into the system processor would convert the entered data to zone information. The display may be a seven-segment digit display indicating the weight of a parcel in metric or English units, its destination zone, a country code for international mailings and the required postage. In a preferred embodiment, the system would provide visual error codes to inform the user of certain types of system errors.

The system processor 10 is adapted to receive weight-indicating signals from a scale subsystem processor 14 which provides an encoded weight signal representing a parcel weight in pounds, ounces and fraction of ounces, or, in the metric system, in kilograms and grams.

The system processor 10 is also connected to a postage printing subsystem processor 18 which sets and operates one or more postage printers 20. The connection between the postage printing subsystem processor 18 and the postage printers 20 is shown as bidirectional since the postage printers include sensors which supply signals to the subsystem processor representing the current setting of each printer.

The system processor 10 may also communicate with a peripherals subsystem processor 22 which can control and monitor a number of peripheral devices 24, including, for example, a parcel identification number counter of the type used for United Parcel Service postage transactions, a document printer which would provide a written record of the postage transactions occurring within the system, and a floppy disc unit or magnetic tape unit for providing magnetic record storage of the system transactions.

Operations within the multiprocessor system are controlled by system clock signals generated within the system processor 10 and applied to the processors 14, 18 and 22 over a common clock bus 26.

Other connections from the system processor 10 which are common to the other processors in the overall system include a shift clock (SHCLK) bus 28, a ready (RDY) bus 30 and the serial data bus 32. Each of these busses is bidirectional. That is, 14, 18 or 22 and sent via the appropriate bus to the system processor 10 or at the system processor 10 and sent over the same bus to one of the subsystem processors. Generally, the SHCLK signals carried by bus 28 are used in shifting data from a transmitting processor to a receiving processor. The RDY signals on bus 30 provide a signal to the receiving processor that the transmitting processor is enabled to transmit binary data over the serial data bus 32.

Interprocessor communications are controlled by the system processor 10 which, operating under the control of a stored program, addresses any of the other processors with which data is to be exchanged by means of an attention (ATTN) signal. Individual connections from the system processor to the other processors carry these ATTN signals. Unlike the other earlier-discussed busses, each ATTN line runs between the system processor 10 and only one of the subsystem processors in the system. More specifically, ATTN line 34 connects the system processor 10 to the scale subsystem processor 14, ATTN line 36 connects system processor 10 to the postage printing subsystem processor 18 and ATTN line 38 connects the peripherals subsystem processor 22 to the system processor 10.

Each of the subsystem processors 14, 18 and 22 can respond to an ATTN signal transmitted over fts dedicated attention line by returning an acknowledge (ACK) signal to the system processor over a common bus 40. The bus 40 can be shared by the subsystem processor since it can logically be assumed that only the subsystem processor which is being addressed over its dedicated attention line will be replying with an ACK signal.

The system processor 10 and the scale subsystem processor 14 are additionally connected by reset, test and weight mode connections 42 which give the system processor 10 a limited amount of control over the operation of the scale subsystem processor 14.

Figure 2A:
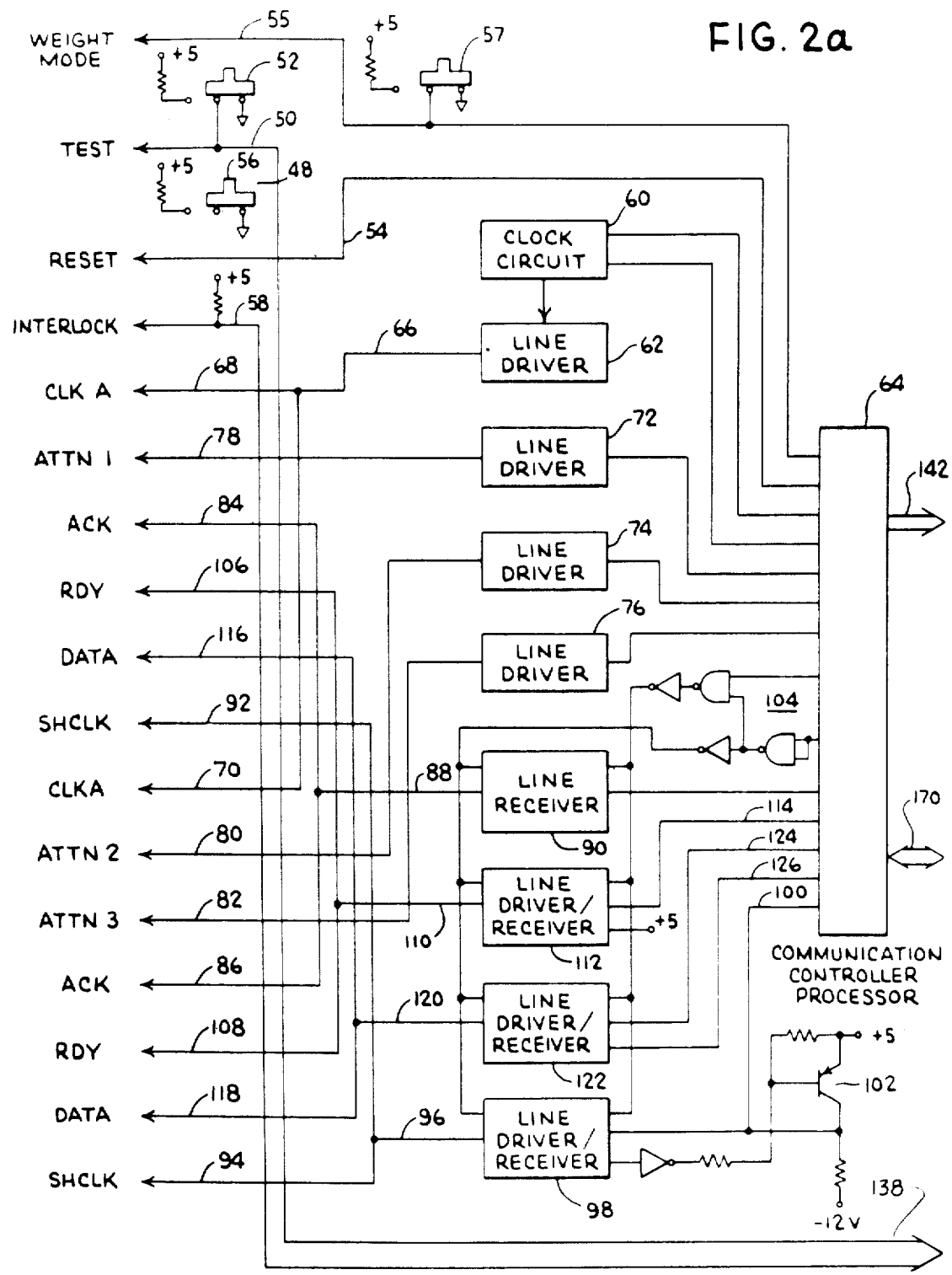
FIG. 2, comprising FIGS. 2a, 2b and 2c taken together, is a more detailed schematic diagram of the system processor in the system of FIG. 1.
Figure 2B:
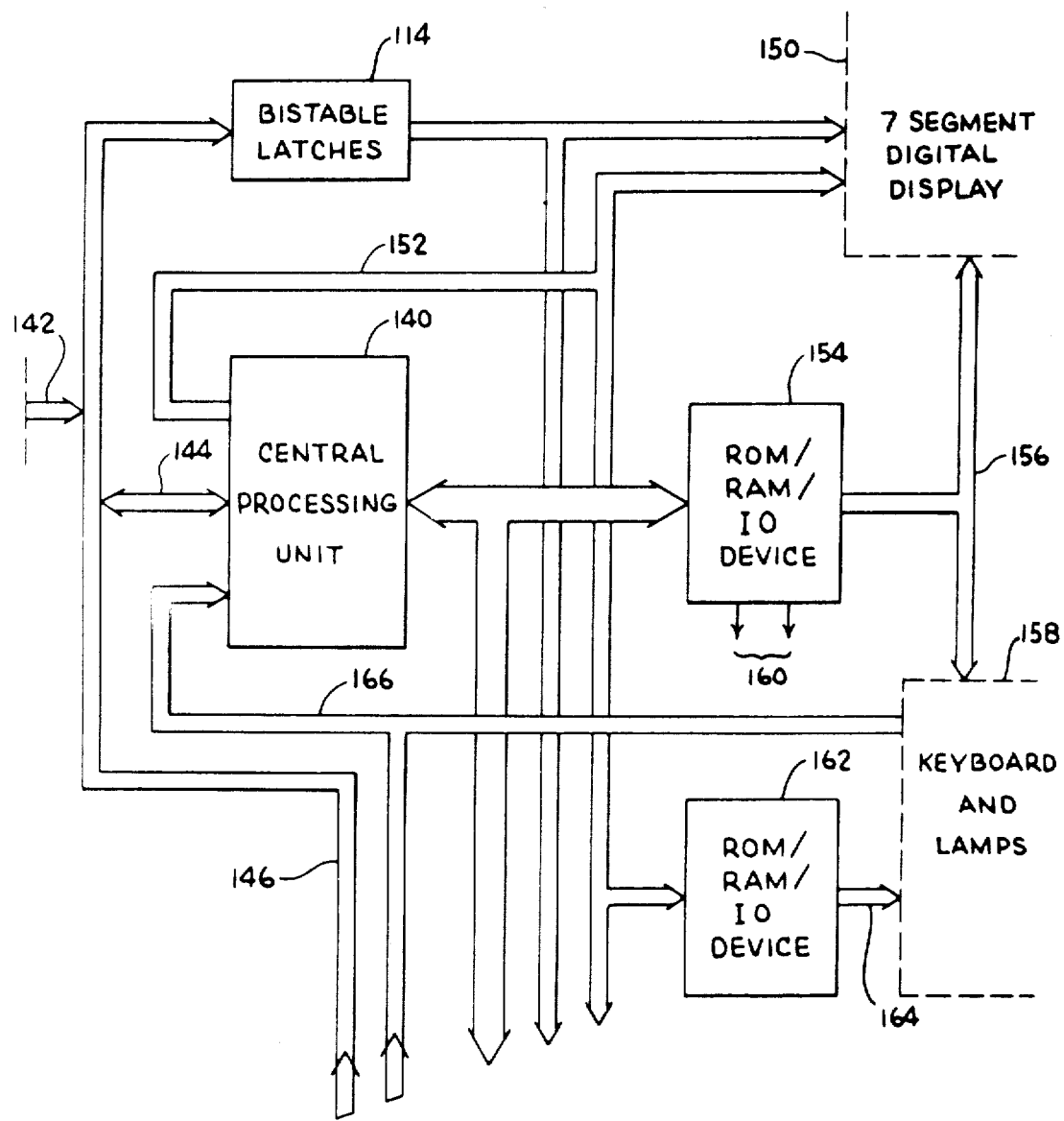

FIGS. 2a, 2b and 2c taken together provide a more detailed schematic diagram of the system processor 10. The interprocessor connections described generally with reference to FIG. 1 are shown at the left of FIG. 2a while the system input/output connections and the internal system processor connections are shown generally in FIGS. 2b and 2c.

Beginning at the upper left hand corner of FIG. 2a, the test, reset and weight mode lines 42 from the system processor to the scale subsystem processor 14 are shown in more detail. The test line 50 includes a slide switch 52 which can be manually positioned to establish either a positive 5 volt potential or a ground potential at line 50. Test line 54 and weight-mode line 55 include similar slide switches 56 and 57, respectively. When the slide switch 52 is moved to the left to establish a positive 5 volt potential on test line 50, the system processor and the scale processor enter a test mode in which communications with all other processors is inhibited. In the test mode, the scale will output the five least significant weight data signals in binary coded decimal format over the serial data bus. This information will be displayed on the display associated with the system processor 10 for use by a service man.

The reset signal supplied over line 54 is used to signal the scale subsystem processor to reset or re-zone the scale. The weight mode signal is used to determine wether the scale output presents pounds and ounces or kilograms and grams.

An interlock terminal 58 is connected to a 5 volt source through a voltage dropping resistor. When the scale subsystem processor is in place, the terminal 54 is connected to a ground in the subsystem. If the scale subsystem is not in place, terminal 54 carries the +5 volt potential of the source. System processor 10 monitors the voltage of terminal 54 to be sure the scale is in place.

The system includes a clock circuit 60 connected to the interprocessor CLK A bus through a line circuit 62. The clock circuit 60 interfaces with a processor 64, dedicated primarily to controlling interprocessor communications. Line driver circuit 62 could be one stage of a tri-state line transceiver circuit such as the DS8833 integrated circuit available from National Semiconductor Corporation. Each stage of this transceiver circuit can be used both as a line driver or as a line receiver in interfacing TTL circuits with MOS circuits. Each stage is also capable of entering a high impedance state in which the circuit appears as an open circuit to the connected systems.

As a matter of convention, a transceiver circuit (such as a line driver 62) used only to drive one of the interprocessor communication busses is referred to only as a line driver circuit. If a transceiver circuit is used only to receive signals, that circuit is described as a line receiver circuit. Where the signal flow is bidirectional, the circuit is identified as a line driver/receiver circuit.

The output 66 from the line driver circuit 62 is applied both to a CLK A bus 68 coupled to the scale subsystem processor 14 and to a CLK A bus 70 shared by the postage printing subsystem processor 18 and the peripheral subsystem processor 22.

The individual ATTN signals are provided by processor 64 through separate line driver circuits 72, 74 and 76. The output of line driver circuit 72 is an ATTN 1 signal supplied over dedicated line 78 to the scale processor 14. The outputs from the line driver circuits 74 and 76 are, respectively, and ATTN 2 signal supplied over line 80 to the postage printing subsystem processor 18 and an ATTN 3 signal applied on line 82 to the peripherals subsystem processor 22.

As indicated above, a single attention line is dedicated to each different subsystem processor while the ACK lines may be shared by the subsystems.

For that reason, an ACK line 84 from the scale subsystem processor 14 and an ACK line 86 shared by the postage printing subsystem processor 18 and the peripherals subsystem processor 22 are combined to provide a single ACK input 88 to a line receiver circuit 90 at processor 64.

Connections for those signals which can originate either at the system processor or at one of the subsystem processors, depending on which of the processors is transmitting, are also shown. Data shifting pulses are provided over SHCLK line 92 to the scale subsystem processor 14 and SHCLK line 94 shared by the postage printing subsystem processor 18 and peripherals subsystem processor 22. These two lines are connected through a common line 96 to a line driver/receiver circuit 98 having a direct output connection 100 and an input connection to the processor 64 through a high impedance switching circuit 102. When the processor 64 is the transmitting processor, line driver/receiver circuit 98 is conditioned by a control circuit 104 to transmit output SHCLK pulses from processor 64 to the SHCLK terminals 92 and 94. Only the processor previously addressed by a signal on one of the dedicated ATTN lines will, however, be conditioned to accept the SHCLK pulses. The line driver/receiver circuits of non-addressed processors will be in their high impedanc states and will effectively block SHCLK signals to their processors.

When the processor 64 is the receiving processor, line driver/receiver circuit 98 is conditioned by circuit 104 to accept SHCLK pulses over common connection 96 from either of the SHCLK lines 92 and 94.

The connections between the processor 64 and the other processors in the system include the RDY bus 106 to the scale subsystem processor 14 and RDY bus 108 to the postage printing subsystem processor 18 and peripherals subsystem processor 22. These two RDY busses have a common connection 110 to a line driver/receiver circuit 112 having an input connection 114 to the processor 64. The output connection for the line driver/receiver circuit 112 is a 5 volt source. Whenever circuit 112 is conditioned to operate in its driver mode, this 5 volt signal is supplied over common connection 110 to the RDY busses 106 an 108.

The serial data bus by which all data is transferred from one processor to another in the system is also a shared bus. The data bus includes a first connection 116 to the scale subsystem processor 14 and another connection 118 shared by the postage printing subsystem processor 18 and the peripherals subsystem processor 22. A single lead 120 from 116 and 118 is tied to a line driver/receiver circuit 122 having an input connection 124 and an output connection 126 to the processor 64.

While the processor 64 is defined as part of the system processor 10, processor 64 is dedicated primarily to controlling communications with other processors in the complete system. Processor 64 serves a supporting role relative to a central processor unit 140 to which it is connected through a four line signal path 142 shown both in FIG. 2a and 2b. As indicated by FIG. 3, the overall system is laid out with FIG. 2b and 2c being located to the right of FIG. 2a. Connections common to the different figures are represented by cable connections which, if extended, would continue into similar cable connections in adjoining figures. For example, if cable 142 were extended from the right side of FIG. 2a, it would continue into the cable 142 shown to the left side of FIG. 2b. While the system has been broken down for purposes of illustration by the use of such discontinuous cable, it should be understood that cables bearing the same number in different Figures are actually the same, continuing cable.

The four bit parallel output from processor 64 at cable 142 is supplied to the central processing unit 140 at input/output terminals connected to a cable 144. Postage rate data is similarly applied to the central processing unit 140 through cable 144 from a four bit lead 146 to a postal rate read only memory to be described in more detail later.

The central processing unit 140 controls a digital display 150 through a four bit parallel output to a set 148 of bistable latches and another four bit parallel output 152 applied directly to the digital display 150. In a preferred embodiment of the invention, the central processing unit 140 is also connected to a ROM/RAM/IO device 154 which, as the name indicates, contains read only memory storage locations, random access read/write storage locations and input/output ports. Device 154 may, by itself, be conventional in nature. For example, an A17 integrated circuit chip manufactured by Rockwell International Corporation provides each of the functions of device 154.

The primary output from ROM/RAM/IO device 154 is set 156 of strobe outputs which are used to sequentially strobe or energize both the individual digits in the digital display 150 and columns of key-actuated switches in a system keyboard 158. The device 154 also includes chip select outputs 160 for permitting the central processor unit to address other ROM/RAM/IO units via unit 154.

Another of the ROM/RAM/IO devices included within system processor 10 is device 162 which provides read only and read/write storage locations and a multiple bit output 164 which can be decoded to drive indicator lamps in the keyboard and lamp circuit 158. As will be explained in more detail later, the keyboard 158 can provide data from up to forty keys through four parallel leads 166 to the central processing unit 140 to identify which keys on the keyboard are depressed.

Referring to FIG. 2c, the system processor includes a third ROM/RAM/IO device 168 to which cable 138 is connected. The device 168 also communicates directly with the processor 64 through five parallel input/output leads 170. Device 168 communicates with the central processor unit 140 and with a fourth ROM/RAM/IO device 172. Device 172 has a four bit output which, in combination with two other four bit outputs from the central processing unit 140, provide a twelve bit address for accessing read only memory 174 to retrieve postage rate information. The required postage rate data is, in one embodiment, stored on several read only memory chips. For that reason, some of the twelve bits of addressing information is necessarily used to select the chip from which postage data is to be retrieved with the remaining bits being used to select a particular storage location on that chip. Postage data retrieved from the memory 174 is presented in parallel over two four bits cables 146 and 166, also shown in FIG. 2b. All data provided over the eight data lines is input to the central processing unit 140.

Figure 4:
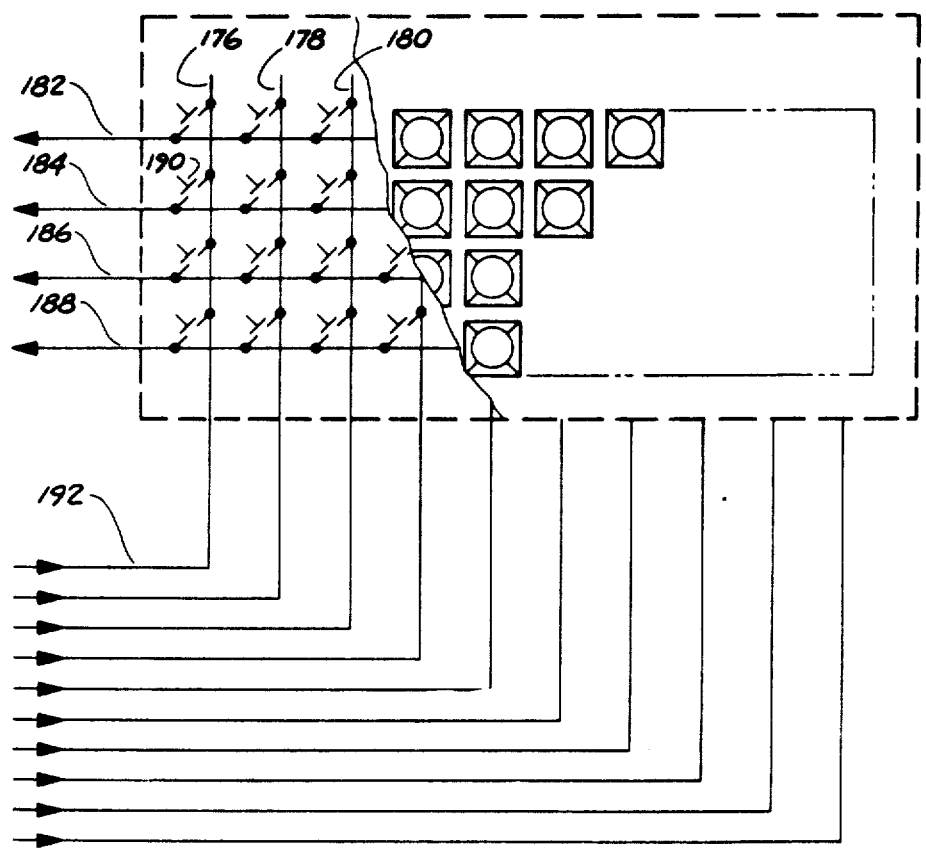
FIG. 4 is a schematic representation of the electrical connections of the keyboard data entry subsystem.

The number of keys in the keyboard of the system may vary, depending upon the complexity of the functions which the system is expected to serve. In a preferred embodiment of the system, up to 40 different key depressions can be detected by arranging the keys of the keyboard in a row and column matrix with each of the rows having a common connection to a keyboard return to the system and each of the columns having a common connection to a strobe output from the system. Such an arrangement is illustrated in FIG. 4 wherein three complete columns 176, 178 and 180 of key connections are shown. Each column is connected to one of ten strobe outputs from ROM/RAM/IO device 154. The device 154 sequentially raises these strobe outputs to provide a binary one signal which ripples across the array of strobe connections. If a switch at the junction of a particular column and a particular row is closed or depressed when the strobe line is energized, the binary one signal is transmitted on the return back to the system. Conversely, if the switch is open when the column voltage is raised to a binary one level, the return will see only an open circuit. As a specific example, if a switch 190 at the junction of column 176 and row 184 is closed when strobe line 192 is driven to a binary one level, the voltage return 184 will carry a binary one signal. If the remaining switches in column 176 are open at the time, a 0100 signal would be read by the system by raising the voltage on the strobe lines in succession, permitting the keyboard to be checked for depressed keys four at a time.

Figure 6:
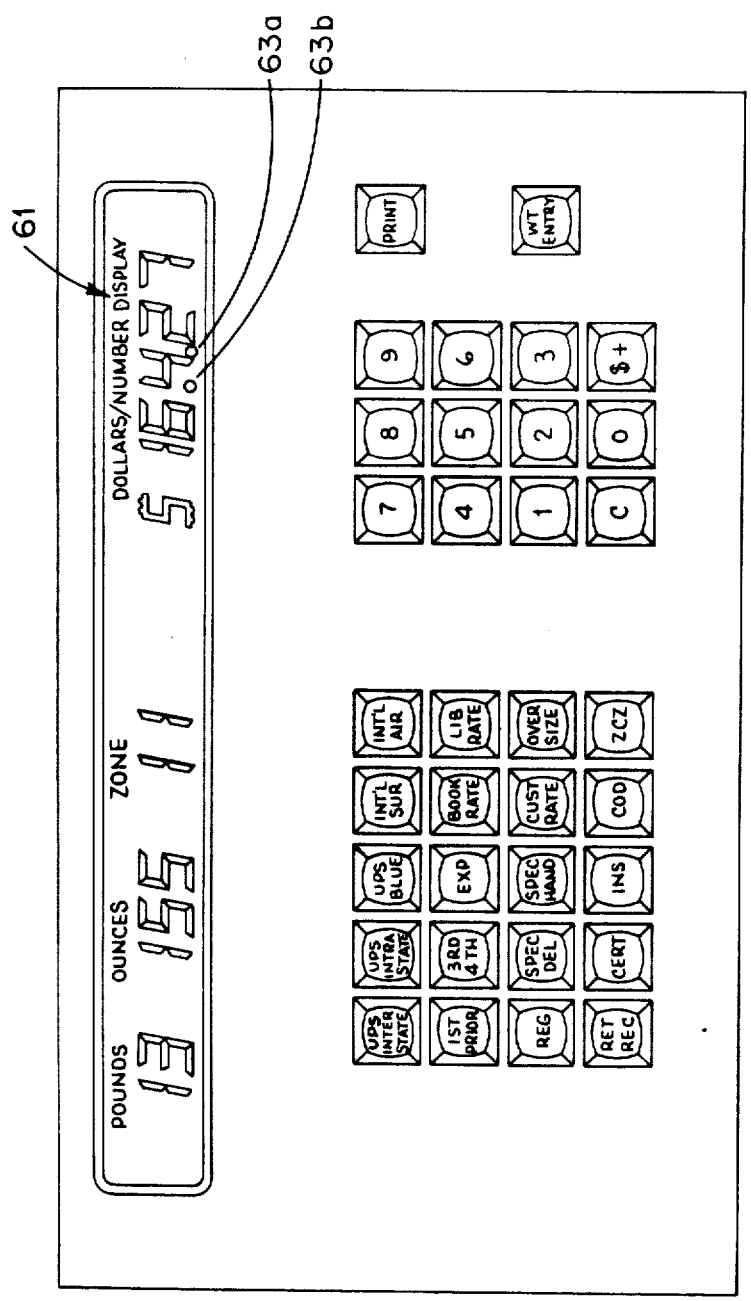
FIG. 6 shows the layout of a keyboard which would be used to enter the necessary data.

A preferred keyboard layout is shown in FIG. 6. The keyboard includes a visual display capable of displaying a parcel weight in pounds (or kilograms) and ounces (or grams). The visual display includes a zone section and a dollars/number display at which computed postage amounts are displayed. The dollars/number display can also be used to display error codes for mailing errors such as an overweight package or an invalid mode of shipment.

The keyboard includes a 12 key numerical entry section. The type of information entered through this section can include two digit zone entries for domestic mailings, three digit country codes for International mailings, known postage amounts, and the like. A $+ key is provided to permit the user to add special fees not otherwise provided for in the calculator.

A 20 key class of service keyboard section permits the user to select from various United States Postal Service classes, United Parcel Service classes or international classes of service. Special fee keys are provided for permitting additional postage to be computed for special services such as registered ail, special delivery mail, insured mail and the like. A ZCZ key calls a zip-to-zone conversion routine. When this routine is called, a user can enter the three digit prefix or the zip code of a domestic destination. The calculator will compute the zone value using the local zip code at the point of origin as a base value.

It will be noted that the keyboard includes only two keys relating to international rate structures. One key specifies that a parcel is to travel by international surface mail while the second key indicates that a parcel is to travel by international; airmail. There are five major rate structures employed by member countries of the International Postal Union for mailing of parcels between member countries. These major rate structures are a letter class, a parcel post class, a printed matter class, a book class and a small packet class. When a user wishes to send a parcel through the international mails, he must select either the air or the surface mode of transportation. A four digit code must also be entered into the calculator through the numerfcal keyboard. The first digit identifies one of the five classes of service. The last three digits is a code number specifying the country of destination. The manner in which this data is processed is described in more detail later.

The keyboard further includes a Print key by which the user enables a postage meter to actually print the computed postage directly on a parcel or on a tape once the user is satisfied that the proper information has been entered into the calculator.

Normally, the system operates on signals from the scale subsystem processor provided in accordance with a format to be described. However, the keyboard includes a Wt Entry key which permits a user to manually enter the weight of a parcel if it is known to him.

Figure 5:
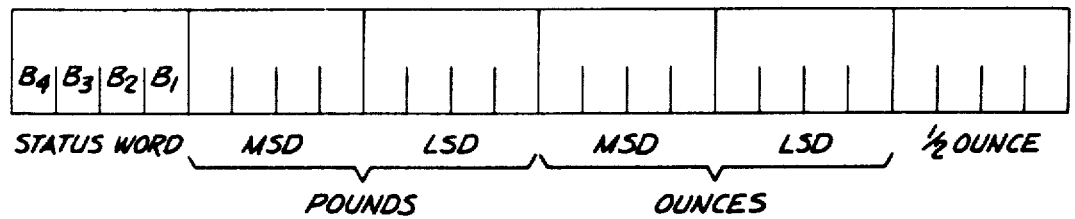
FIG. 5 shows the format of a message transmitted from a scale processor to the system processor.

The format for data transferred from the scale processor 14 to the system processor 10 is shown in FIG. 5. Scale data is transmitted over the serial data bus in a six word message comprising a status word, plus (in English units) two pound weight information words, two ounce weight information words and one word of half ounce weight information. Where the weight is expressed in metric units, two of the words would represent kilograms while the three remaining words would represent 100 gram, 10 gram and 5 gram weights, respectively. Each word in the message is four bits long. The five weight information words present information in binary coded decimal of BCD format. In a preferred embodiment, the scale is capable of resolving parcel weight to the nearest half ounce or nearest five grams. Therefore, the last information word in the message format is always either 0101 (representing a half ounce or five grams) or 0000, indicating the parcel weight is rounded to the nearest next larger weight unit.

The status word is a four bit word used to convey information about scale operation from the scale subsystem processor 14 to the system processor 10. In one embodiment of the fnvention, the most significant bit B4 of the status word is being transmitted. Depending upon its intended use, the system may be concurrently connected to a scale having a relatively small capacity, such as 12 pounds, and to a scale having large capacity such as 25 pounds or 70 pounds. The system distinguishes between the 12 pound scale and the other two scales since different data processing steps are required.

Bit B3 is a data validation bit which must possess a predetermined binary value before the system processor will accept the weight information in the message as valid. A data validation bit is necessary in the status word since the scale processor will supply weight information to the system processor upon command without regard to whether the scale has reached an equilibrium condition. The value of bit B3 indicates to the system processor whether the scale is still moving, and therefore generating invalid weight signals, or whether it has reached a steady state or equilibrium condition in which valid weight readings can be taken.

Bit B2 of the status word is an "overweight" bit which indicates to the system processor whether the parcel weight has exceeded the maximum weight which the scale can normally be expected to measure. This bit inhibits the system from treating an overweight package as if it weighed the maximum possible scale weight.

Bit B1 of the status word is a sign bit which is used in checking scale calibration. A negative scale weight reading, preferably indicated by binary one in this bit position of the status word, would indicate that the scale needs to be recalibrated.

The above-described functions of the individual bits in the status word presumes the scale is operating normally. The status word can also be presented by the scale subsystem processor to indicate a malfunction in either the scale element or in the scale processor connected to that element. For example, setting the status word to 1111 might be used to indicate a weighing element malfunction while a status word of 0111 might be used to indicate a scale subsystem processor malfunction.

Figure 7A:
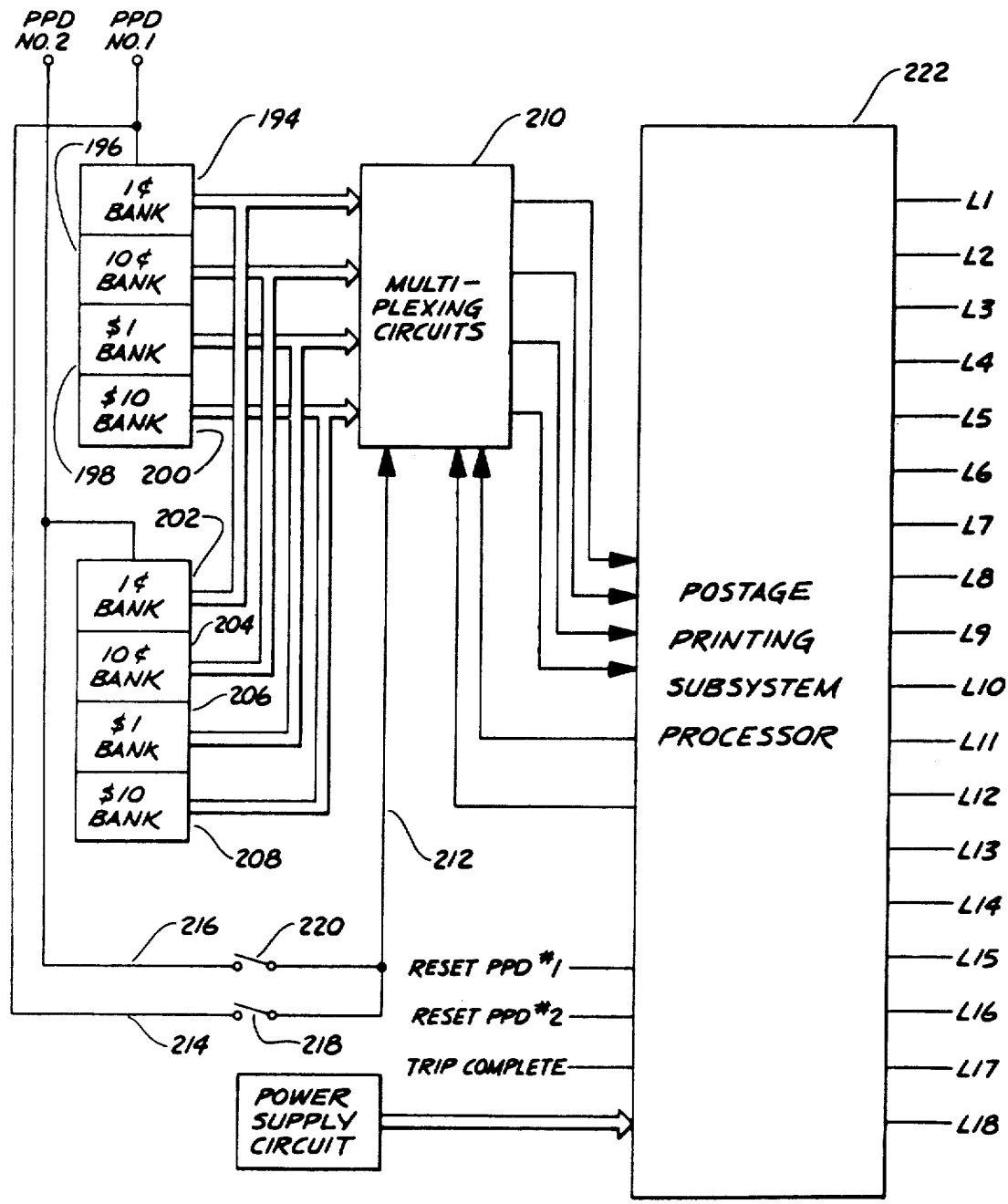
FIG. 7, consisting of FIGS. 7a and 7b taken together, is a more detailed schematic diagram of the postage printing subsystem processor with its input and output circuits.
Figure 7B:
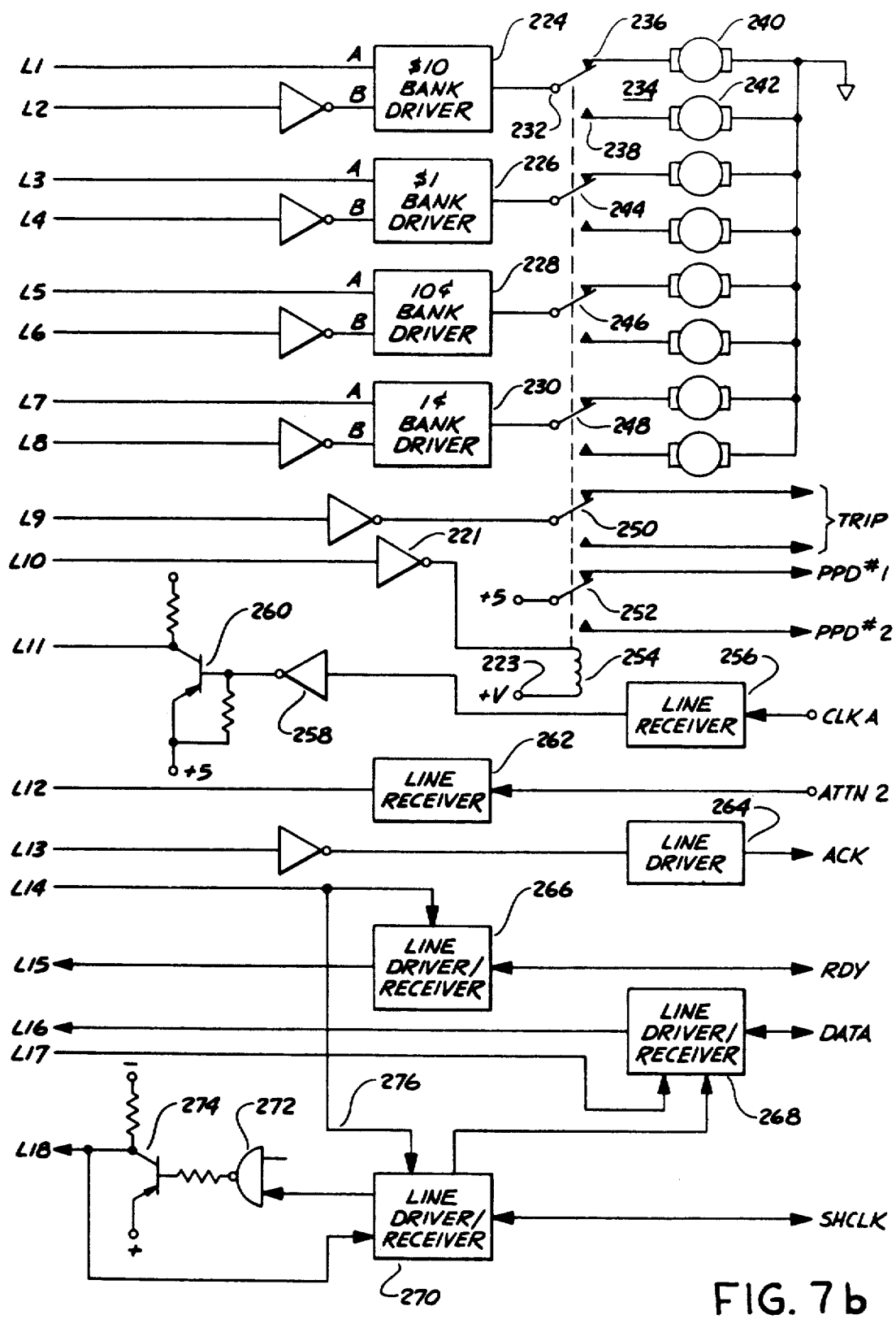
Figure 18:
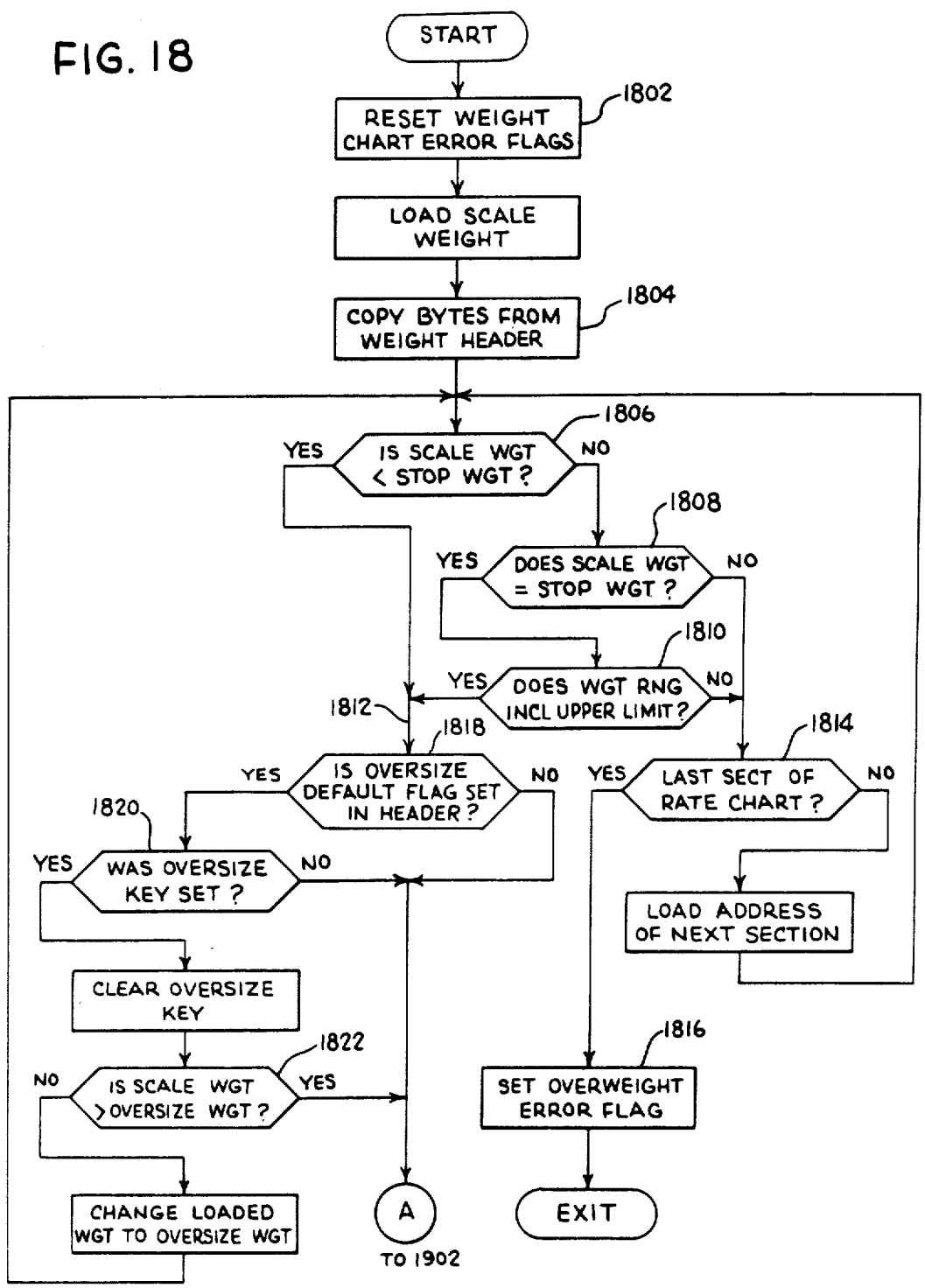
Figure 19:
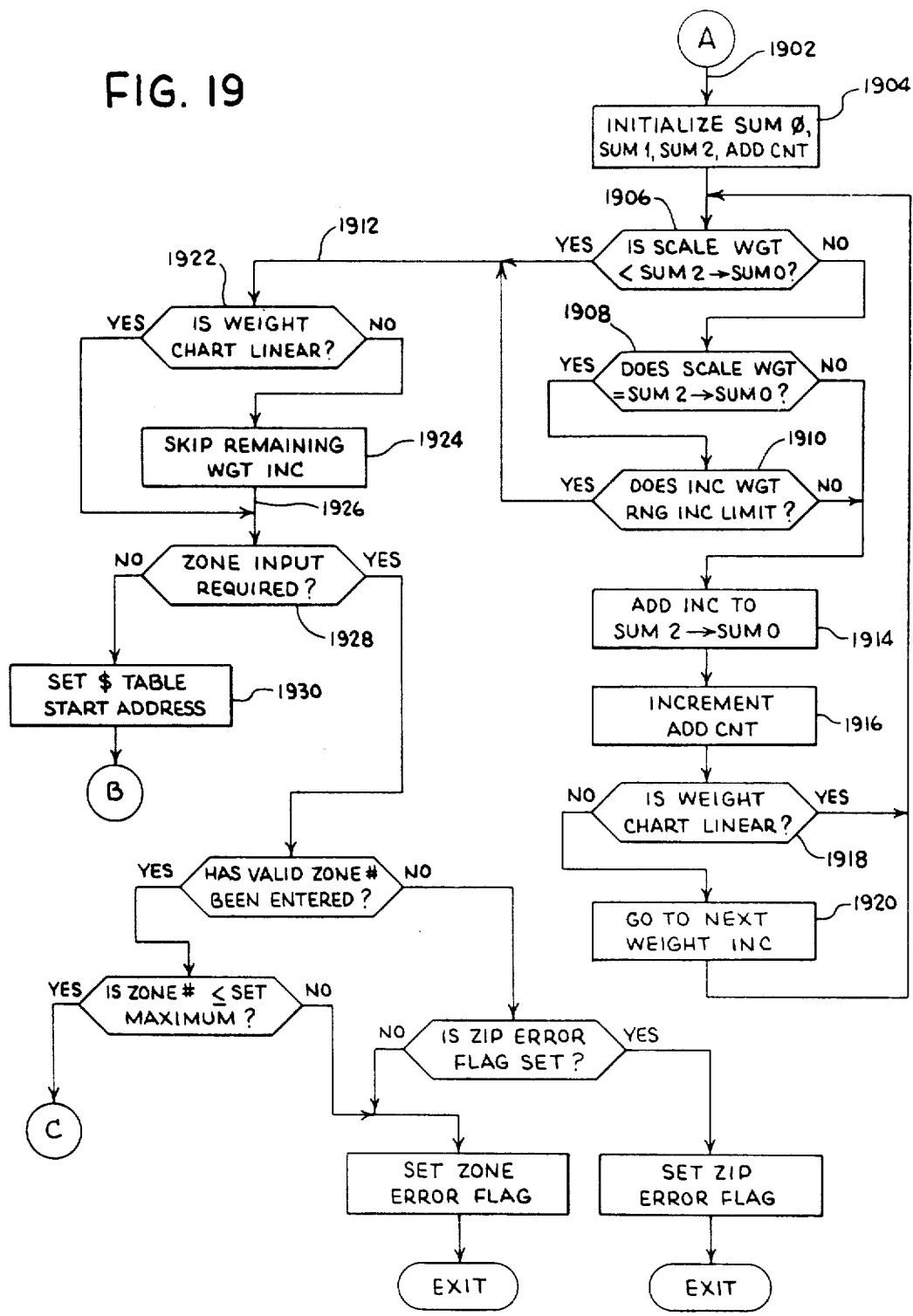
Figure 20:
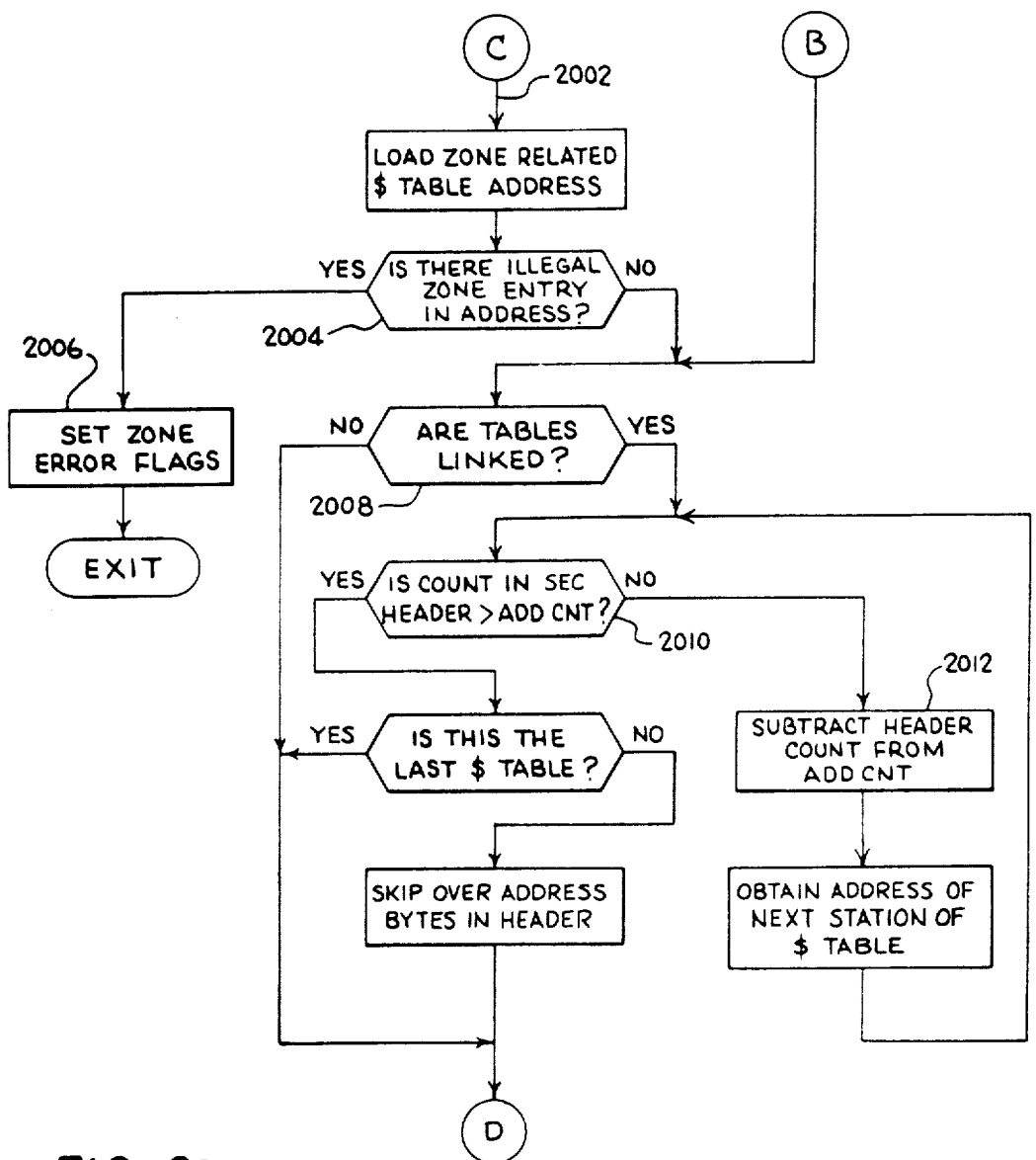

FIGS. 7a and 7b, taken together, provide further details concerning a postage printing subsystem according to a preferred embodiment of the invention. Brief reference should be made to FIG. 8 which establishes the correct orientation of FIGS. 7a and 7b relative to one another.

The postage printing subsystem processor 222 can be used to set either of two postage printing devices identified as printers PPD1 and PPD2. Only the electrical components of these postage printing devices are illustrated. Basically, each device is a four digit printer with each digit or bank being independently settable to a numerical value in the 0-9 range. Referring specifically to FIG. 7a, the current setting of each digit of the PPD1 printer is detected by sensor circuits 194, 196, 198 and 200, each of which provides a multiple bit output which may be decoded to determine the current position of the associated printing element. The current settings of the printing element in the PPD2 printer are monitored by a separate set of sensor circuits 202, 204, 206 and 208.

The sensor outputs for the corresponding digits in the two printing devices are combined at the input to a multiplexing circuit 210, which is also supplied with signals indicating whether one or both of the printing devices are actually in place. These printer-in-place signals are provided over an input 212 which branches to a lead 214 from the PPD1 power circuit and to a lead 216 from a PPD2 power circuit. Branch 214 includes a similar switch 220. If the printing device energized by the corresponding power circuit is in place, the switch in that branch is closed by means of a mechanical interlock. When the power circuit is energized, a positive voltage is established on the input 212 through the closed switch. The lack of a positive voltage on input 212 when a printing device has been nominally selected is interpreted as meaning that the printing device is not actually in place.

In a preferred embodiment, each sensor circuit input to the multiplexing circuit 210 is a three bit word. The multiplexing circuit 210 selects each three bit word in sequence, passing those signals onto the postage printing subsystem processor 222. The multiplexing circuit 210 cannot, of course, distinguish between the three bit words supplied by corresponding sensor circuits in the two sets of circuits; for example sensor circuit 194 and sensor circuit 202. The processor must "remember" which printing device is being monitored in order to know which of the two sets of sensor circuits is not energized and cannot interfere with the reading of the selected sensors.

Other inputs to the postage printing subsystem processor 222 include a RESET PPD1 input, a RESET PPD2 input and a TRIP COMPLETE input. The RESET inputs are operator-initiated inputs which will cause all printing banks of the identified printing device to be reset to zero. The TRIP COMPLETE input is an optical input which indicates to the processor that all mechanical interlocks which might otherwise inhibit a postage printing cycle have been cleared.

Other input/output connections to the postage printing subsystem processor 222 includes a set of leads L1-L18. Of these, L1-L10 provide the control signals for setting the printing devices while leads L11-L18 provide the interface to the other processors in the multiprocessor system.

Lines L1 and L2 are connected to a pair of inputs to a motor driver circuit 224 for the printing elements in the $10 bank of the postage printing devices. A motor driver circuit 226 for the $1 banks is similarly connected to lines L3 and L4 while a motor driver circuit 228 for the $0.10 banks is connected to lines L5 and L6. Finally, motor driver circuit 230 for the $0.01 banks is connected to lines L7 and L8 from the processor 222. An output from each of the motor driver circuits 224, 226, 228 and 230 is connected to one terminal of a single pole double throw (SPDT) switch which permits the motor driver circuit to be connected to either of two electrical motors. For example, the output of motor driver circuit 224 is connected to a terminal 232 of a SPDT switch 234 having contacts 236 and 238. When terminal 232 is tied electrically to the contact 236, the motor driver circuit 224 controls an electric motor 240 which can be driven in either direction to set the printing element in the $10 bank of one of the printing devices to desired positions. Conversely, when the terminal 232 is electrically connected to the contact 238, the motor driver circuit 224 controls a second motor 242 which sets the printing element in the $10 bank of the second printing device.

Each of the motor driver circuits decodes the two inputs it receives from the processors 222 to provide control signals which will cause a positive voltage, a negative voltage or no voltage at all to be applied to the SPDT switch at the circuit output. Since the opposite terminal of each motor is connected to ground, the polarity of the input voltage or the lack of such a voltage determines whether the motors are being driven, and, if so, in what direction. A truth table for the inputs to each of the motor driver circuits is:

| Input | | Motor Output |
| --- | --- | --- |
| A | B | |
| 0 | 0 | Decrease Bank Setting |
| 0 | 1 | Illegal Code-Not Used |
| 1 | 0 | No Change in Bank Setting |
| 1 | 1 | Increase Bank Setting |

A similar SPDT switch 250 connected to output L9 from processor 222 is used to provide a print-enabling TRIP signal to a selected one of the printing devices once the necessary conditions have been found to exist. Another SPDT switch 252 has its "input" connected to a five volt source and its output terminals connected to the PPD1 and PPD2 power supply terminals shown at the top left corner of FIG. 7a.

All of the above-described SPDT switches are ganged for synchronous operation under the control of a solenoid 254 having its lower terminal connected to a positive voltage source 223 and its upper terminal connected through an inverter 221 to line L10 from postage printing device processor 222. When the solenoid 254 is de-energized by driving the output of inverter 221 to the level of the voltage from source 223, the blade of each of the switches remains in its upper position. In the upper position, drive motors for printing device PPD1 are connected to the motor driver circuits 224, 226 and 228 and 230 while the five volt source is connected through switch 252 to provide power for the sensor circuits 194, 196, 198 and 200 for device PPD1. Conversely, when the solenoid 254 is energized, the SPDT switches are set to their lower positions wherein the setting motors for printing device PPD2 are connected to switch 252.

In another embodiment of the subject invention either or both of printers PPD1 or PPD2 may be printers capable of printing fractional postage values. Thus the 0.1 cent bank of such a printer would be connected to the associated 1 cent inputs of multiplexer 210 and to the 1 cent setting motor, and the connections for the other banks of such a printer shifted accordingly. Postage values determined by processor 10 would then be printed as though divided by a factor of 10. Postage values determined by system processor 10 are transmitted to postage printing subsystem processor 222 with additional information which defines the position of the decimal point in the determined postage value in a manner which will be more fully described below. Processor 222 then outputs the determined postage value to the appropriate banks of the fractional cent printer. Alternatively an electronic postage meter such as a Pitney Bowes Model 6500, produced by the Pitney Bowes Corporation of Stamford, Conn., may be used in place of the mechanical meters described above and the decimal position in the printed postage value set electronically (Interfacing such an electronic postage meter to the system described above would be a conventional task will within the skill of a person skilled in the art and it is believed need not be further described for an understanding of the subject invention.)

As another alternative two meters, one having fractional cent capability, could be used and the system modified to control interlock switches 218 and 220 and solenoid 254 electronically by processor 222. The determined value would then be transmitted to the appropriate printer in accordance with the additional information defining the decimal point position.

The postage printing subsystem processor 222 interfaces with the other processors in the system through lines L11-L18. The system clock or CLK A signals are applied to line receiver circuit 256 which drives an inverter amplifier 258 at the input to a high impedance switching circuit 260. The output from the switching circuit 260 is connected to terminal L11 to provide clock pulses for synchronizing operations within the postage printing subsystem processor 222 with operations elsewhere in the system.

The attention signal ATTN2 dedicated to the postage printing subsystem processor 222 is applied to terminal L12 through a line receiver circuit 262 while the acknowledgement signal ACK provided by the processor 222 in response to the ATTN2 signal is output from terminal L13 through a line driver circuit 264.

RDY signals originating elsewhere in the system are applied to terminal L15 of the processor 222 through a line driver/receiver circuit 266 while RDY signals originating within processor 222 are output from terminal L14 to the circuit 266.

The serial data bus over which the processor 222 exchanges status information and data with the remainder of the system includes a line driver/receiver circuit 268 through which incoming data can be applied to terminal L16 of the processor 222. Data originating within the processor 222 is output from terminal L17 to the line driver/receiver circuit 268.

SHCLK pulses used in transmitting data to and from the processor 222 one bit at a time are applied through line driver/receiver circuit 270. Incoming SHCLK pulses are applied through circuit 270 and serially-connected inverter gate 272 to a high impedance switching circuit 274, the output of which is connected to terminal L18 of the processor 222. Outgoing SHCLK pulses are generated only when such pulses appear on terminal L18 while a connection 276 from terminal L14 to the line driver/receiver circuit 270 indicates that the outgoing RDY line is also high. When both conditions are satisfied, line driver/receiver circuit 270 passes data shifting pulses to line driver/receiver circuit 268 in the DATA bus circuit to permit data to be transmitted from the processor 222 onto the serial bus.

Unless stated otherwise, it can be assumed that any table entry is in the form of two four bit words encoded in hexadecimal format.

Referring first to FIG. 9, data defining various rate chart structures is stored in major blocks of the progammable read only memory of the system processor. One form of stored data is a system directory table which contains the starting addresses for common structured rate data. More particularly, the system directory table includes the starting addresses for the several different classes of mail service available from the United States Postal System and the starting addresses for the several classes of delivery service provided by United States Parcel Service. The system directory table also includes the starting addresses for the various classes of postal service (letter, small packet, etc.) provided by the terms of the International Postal Union agreement.

While FIG. 9 shows memory blocks of approximately the same size for the system directory table and the various major rate structures, this is a matter of drafting convenience only. In fact, the different rate structures may require considerably different amounts of memory.

Each of the different rate structures is defined in terms of the weights of parcels which may be mailed and in terms of the dollar costs for mailing parcels of different weights. Generally speaking, the major rate structures are divided into one or more weight ranges which, taken together, span the distance between the minimum and maximum allowable parcel weights for that rate structure. Each weight range will have some weight-related characteristic which distinguishes it from adjacent weight ranges. For example, in one weight range, postage amounts may be changed for every eight ounce increment in parcel weight. In the next higher weight range for the same class of service, the postage amounts may change only for every one pound increment in parcel weight.

FIG. 10 shows the general format for a weight header which would be stored in memory for each weight range within a major class of service. For example, the First/Priority class of service provided by the United States Postal System would have one or more "dedicated" weight headers of the type shown as would the UPS Interstate class of service. Similarly, the International Printed Matter, surface mode, class of service would have its own weight headers.

Referring specifically to FIG. 10, each weight header includes three successive WGT FLAG bytes in which the individual bits (B0-B7) are used to define the meaning of other entries in the weight header. Each of these FLAG bytes is described in more detail with reference to a later Figure. The WGT FLAG bytes may be followed by a special fee mask or rate screen which is interpreted to determine which special fee may be applicable for the weight header class of service. Four special zip to zone vector address bytes may follow if special zone determinations are necessary. Each weight header includes one to three stop weight bytes which define the maximum weight for which the weight header is valid. The address of the header for the next higher range (if any) is defined by successive binary-encoded bytes which follow the stop weight bytes. There is, of course, no Next Chart Address entry for a single section rate structure or for the last chart in a multisection structure.

For certain types of postal service, an oversized parcel weighing less than a certain amount may be mailed as if it weighed the specified amount regardless of its actual weight. Accordingly, an oversize default weight may be specified in one to three successive bytes of the header. As the specific example, current United States Postal Regulations permit a parcel weighing less than 15 pounds and measuring between 84 and 10 inches in combined length and girth to be mailed as if it weighed 15 pounds. Of course, the postage calculator cannot measure the combined length and girth of parcels being weighed. Therefore, to take advantage of this oversize mailing rate, an operator must indicate through the keyboard that the parcel to be mailed is physically oversize.

Each weight header also includes one to three successive bytes defining the start or minimum weight for which the weight header is applicable.

The weight headers define each weight range in incremental terms. The start or minimum weight is defined directly. Then each weight increment which produces a change in postage is defined. Total parcel weight is thus defined as the sum of the start weight and one or more weight increments. For some classes of service, the weight increments throughout the range are equal, providing what is described as a linear weight chart. For a linear weight chart, only one weight increment entry may be defined. For other classes of service, weight increments may not be uniform throughout the weight range. For example, current U.S. Postal Regulations for Priority mail provide that postage amounts are increased at each 0.5 pound or 8 ounce weight increase in a range from 1.0 to 5.0 pounds. However, for parcels weighing more than 5.0 but less than 70 pounds, the postage is increased only once for each pound increase in weight. Such a rate chart is defined as a non-linear chart since the weight increments are not the same throughout the weight range. For example, if the weight header were to cover the entire span from one pound to 70 pounds, the start weight would be defined as 1.0 pounds, each of the first eight weight increments would be 0.5 pounds and the remaining weight increments would be 1.0 pounds.

A weight delimiter entry follows the last weight increment entry in the weight header in non-linear weight charts. Preferably, the delimiter consists of two four bit words, equal to FF16 in hexadecimal format.

If the rate chart is zone structured, the weight header includes an entry specifying the maximum zone number appearing in the weight header. While United States Postal regulations generally recognize the existence of eight distance-based zones, other types of postal service can have more or fewer zones. The zone entry may follow the single rate increment in a linear weight chart or the weight delimiter entry of a non-linear chart.

The maximum zone number entry is followed in the weight header by dollar table addresses for each of the zones within the maximum number. For most United States Postal Services, dollar table addresses would be provided for zones 0 through 8. Where different zones share the same dollar rate structure, the dollar table addresses are, of course, the same. For example, current Priority mail regulations provide that parcels being mailed locally (zone 0) or to zones 1 through 3 are to be mailed at the same postage rates. For this class of service, the dollar table address is identical for the zone 0, zone 1, zone 2 and zone 3 entries.

Each weight header is associated with a dollar table having its own header. The dollar table header is described in more detail later.

The three WGT FLAG bytes which appear at the beginning of each weight header are critical to the definition of the rate structure. Referring to FIG. 11, which is a representation of the eight bit positions in WGT FLAG 1, the binary value of bits B5, B6 and B7 indicate whether the weight header specifies the stop weight in terms of pounds, ounces, and/or fractions of ounces when the English system of units is employed. A binary one in a particular bit position indicates that the header has an entry which will be interpreted as defining the stop weight for a particular unit of measure. For example, if bits B5 and B6 of WGT FLAG 1 are equal to binary one while bit B7 is equal to binary 0, the weight header is interpreted as including two successive entries defining the stop weight of the range in terms of pounds and ounces but not fractions of ounces. The header would not have an entry relating to fractional ounces.

Bit B4 of WGT FLAG 1 is used to indicate whether the weight measurements represent parcel weight in English or metric units of measurement. If bit B4 equals 1, weight header positions normally interpreted as referring to fractional ounces are interpreted as meaning 0.1 grams. Ounce and pound positions are interpreted as 10 gram and 1.0 kilogram positions. To simplify the description herein, only English units of measurement will be mentioned. However, the discussion can be interpreted in metric units simply by making the units conversions mentioned above.

The binary value of bits B0, B1, B2 and B3 of WGT FLAG 1 specify the oversize default weight described earlier. For current United States postal regulations, the oversize default weight is 15 pounds exactly. For such a weight, bit B1 would be set to 1 while bits B2 and B3 would be set to 0. The weight header would be interpreted as having only a single byte defining oversize default weight. Bit B0 is employed to denote which of two possible types of oversize calculations is employed in the rate chart. With bit B0 at a low logic level, the present weight oriented basis is indicated. A binary one at bit B0 indicates an oversize fee calculation based upon a fixed fee or other criteria similar to special fees.

Referring now to FIG. 12 wherein WGT FLAG is depicted, two three bit words indicate whether the start weight entry (bits B7, B6 and B5) and the weight increment entries (Bits B3, B2 and B1) include byte positions for pounds, ounces and/or fractional ounces. For example, the two byte positions need to define a 1.5 pound start weight are specified by setting bit B5 and B6 to 1 and bit B7 to 0. As another example, weight increments can be specified in units of ounces and fraction of ounces by setting bits B2 and B3 equal to 1 while bit B1 is equal to 0.

Bit B4 of WGT FLAG 2 is used to indicate whether or not the rate table employs other than standard zip to zone conversions. With B4 set to a binary zero, standard zip to zone conversions are used in either USPS or United Parcel Service (UPS) format. A binary one indicates employment of other than standard zip to zone USPS conversions with respect to the rate chart and/or particular shipment methods as determined with reference to bit B0.

If bit B4 is set to a binary zero and bit B0 is set to binary zero, standard zip to zone USPS conversion is indicated and zip to zone conversion tables are located without further addressing. The use of UPS zip to zone conversion tables is indicated by providing a binary zero at B4 and a binary one at B0. In such instances, the UPS zip to zone conversion tables will be located by accessing the special zone bytes which follow the special fee masks.

With bit B4 set to one and bit B0 set to binary zero, express mail shipment is indicated with zone data based upon airport to airport distances rather than origin to destination distances while binary one at bit B0 with bit B4 high indicates customer zip to zone conversions which may be encountered in instances wherein postage is applied to parcels which are shipped before mailing. Zip to zone conversions under such circumstances must be made with the remote mailing location as the point of origin.

Referring again to the weight header, in instances wherein other than standard zip to zone conversion and/or UPS is required, the special zone bytes comprise two 16 Bit pointers, the first of which indicates the location of an illegal zip code table. The second special zone 16 bit word in the weight header vectors to the other standard or UPS zip to zone table itself. It should be appreciated that the zip to zone tables contain all zip codes even illegal zip codes, therefore the program is first directed to the illegal zip code table in order to screen out illegal zip codes which may have been entered before proceeding with the actual conversion.

Referring to FIG. 13, each of the eight bits of WGT FLAG 3 serves a different function. A binary one in the bit B0 space indicates that a UPS postage meter should be used to print the computed postage. A binary 0 indicates a U.S. Postal Service meter is to be used. A binary one in the B1 position indicates that the chart is zone structured. For a zone structured chart, the weight header must have an entry defining the maximum number of zones as well as addresses for determining the dollar table location for each of the different zones. Conversely, a binary 0 in the B1 position indicates that the chart is not zone structured. The header will lack entries of the type mentioned above.

A binary 1 at bit B2 indicates that the chart is non-linear and necessarily includes more than one weight increment entry and FF16 delimiter following the last weight increment entry. If bit B2 equals 0, the weight chart is linear, has only one weight increment entry and no FF16 delimiter. Bit B3 indicates whether the rate chart is set up in linked or unlinked format. Each of these formats is discussed in more detail with reference to a later figure. Bit B4 indicates whether the weight increments range up to but do not include the maximum increment value. The value of bit B5 indicates whether the weight range covered by the header includes the stop weight value. Bit B6 equals 1 only if the weight header is part of a single section chart or part of the last chart in a multi-section class of service. When bit B6 equals 0, the weight header is interpreted as including an entry defining the address of the next chart to be used with the scale weight exceeds the stop weight.

The value of bit B7 indicates whether there are any rate screen bytes present in the weight header. As indicated earlier, the rate screen bytes (if any) provide information as to which of different kinds of special fees are applicable to the particular class of service. If there are no applicable special fees, bit B7 equals 0.

There is a dollar table associated with each weight header. The format of a linked dollar table option is shown in FIG. 14. The first two bytes of each dollar table contain a binary representation of the number of postage increments covered by the particular table. Bit B7 of the first byte is reserved for a last dollar table indicator. A binary one value in this position indicates that the particular dollar table is the last table in the particular rate chart. If the dollar table is not the last one in the rate chart structure, the dollar header includes two bytes for the starting address for the next applicable dollar table. The existence of this address in indicated by a binary 0 value in byte 7 of the first byte of the table.

The next entry in the dollar table is a $ Flag byte in which the individual bits are used to interpret other entries in the table. Referring briefly to FIG. 15, bits B4, B6 and B7 of the $ FLAG byte indicate whether the table has entries defining the starting postage amount in hundreds of dollars, dollars and/or fractional cents. The table is assumed to always have a starting cents entry. If bits B4, B6 and B7 are equal to 0, the table is interpreted as having a single entry defining the starting postage in cents only. Bits B3 and 5 of the $ FLAG byte serve the same general function with regard to incremental postage amounts. The table is always assumed to have incremental cents. A binary one in a particular one of these three bit locations is an indication that the dollar table defines incremental postage values in terms of the unit of measure associated with that bit position. For example, if bit B3 is equal to 1 while B5 is equal to 0, the dollar table is interpreted as having entries defining dollar and cents values for each postage increment.

Bits B1 and B2 of the $ FLAG byte specify whether the computed postage is to be rounded and, if so, in what manner. Both of these bits may be set to 0, indicating that no rounding is to be performed. However, only one of the bits can be set to 1 in a given dollar table since the two rounding methods are mutually exclusive. If bit B1 is set to 1, the computed postage is rounded up to the next higher multiple of a rounding increment (to be discussed) if the fractional cents and cents portion of the result is equal to or greater than one-half of the rounding increment. If the fractional cents and cents portion of a computed postage amount is less than one-half of the rounding increment, the computed postage value is adjusted downward to the next lower rounding increment value. If bit B2 is equal to 1, the fractional cents and cents part of a computed postage is rounded up to the next higher multiple of rounding increment unless, of course, that part of the result is exactly equal to the rounding increment.

Bit B0 of the $ FLAG byte indicates whether the dollar table is linear or non-linear. A linear table is one in which the same dollar increment is employed for successive weight increments. Such a table would include only one postage increment entry. A non-linear table is one having different postage increments. A non-linear table will include postage increment entries corresponding to each weight increment in the weight header.

Referring again to FIG. 14, the dollar table includes two four bit rounding words defining a rounding byte when rounding operations are indicated by an appropriate bit in the $ FLAG byte. This rounding byte establishes a rounding increment in a range between one cent and one dollar.

The rounding byte, assuming one is included, is followed by the base or starting postage amount in the dollar table. Depending upon the binary value of bits B4, B6 and B7, this starting entry may consist of one to four successive bytes defining the start value in terms of hundred dollars, dollars, cents, and/or fraction of cents. Starting postage bytes are followed by one or more postage increment entries, each of which, may be one to three bytes long. The dollar table ends with the last postage increment.

As indicated earlier, each rate chart includes one or more weight headers and one or more associated dollar tables. Zone-independent charts generally include only one dollar table for each weight range covered by a weight header. Zone-dependent charts must on the other hand, include several zone-identified dollar tables for each weight range. Zone-dependent rate charts can generally be organized in either of two formats. An unlinked format is illustrated in FIG. 16 while a linked format is shown in FIG. 17. The format employed for a particular rate chart is specified by the value of bit B3 of WGT FLAG 3 in the weight header as mentioned above.

Referring first to FIG. 16 for an example of a rate chart in unlinked format, the rate chart is shown as having, for example, three weight headers, each covering a limited weight range within a particular class of service. For example, the first weight header might define a weight range of 0 to 12 ounces with one ounce increments within the range. The second weight header might define a range of 12 oz. weight 5 pounds in which eight ounce weight increments are used while the third header would cover a range of 5 pounds weight 70 pounds in which one pound weight increments exist.

In the unlinked format, each of the weight headers defining the total weight range of 1 ounce to 70 pounds is followed by the corresponding dollar table is applicable to one of the weight range defined by the weight header. In the given example, separate dollar tables would be provided for each of the three defined weight ranges. Assuming the postage amounts are zone-dependent for all three weight ranges, the dollar tables would have dollar information for each zone for which different postal rates are charged. The addresses for these zone-related tables are obtained in the weight header.

The linked rate chart format (FIG. 17) can be used to conserve memory space where the weight increments are uniform throughout the range of the rate chart notwithstanding the postage increments values may vary randomly with respect to any zone. The weight header for a linked chart includes three WGT FLAG bytes, a stop weight byte, a weight increment byte and byte specifying the maximum number of zones covered by the linked chart. The weight header further includes one or more bytes specifying the address of a dollar table for each of the zones covered by the linked chart.

Typically, the linked rate chart will be employed wherein the weight increments are linear throughout the chart, however, one equation for generating dollar values may apply to one section within a zone and a further equation applies for generation of dollar values for a different section of the same zone. The dollar table for each zone is divided into sections wherein a uniform value increment applies for generation of postage values. Each section includes an individual dollar header comprising a first byte which indicates the number of increments in the section and a second byte which provides the address of the following section. If the number of weight increments of the article to be mailed exceeds the number of increments for the section accessed, the second entry of the dollar header which provides the address for the successive section is the accessed.

When the article weight falls within the range of increments of a section, the next two bytes which specify the dollar start amount and dollar value of each increment is examined in order to generate the appropriate postage value. When the article weight exceeds the weight limit of a dollar header for a section of the table, the number of weight increments in the weight header of such section is subtracted from the number of weight increments of the article and the dollar header of subsequently accessed section is examined with respect to the remaining number of increments of article weight. Where the remaining number of increments falls within the limits of the accessed section, the dollar start value for such section and the dollar value of each increment will provide sufficient information for the generation of the appropriate postage value.

It should be appreciated that the utilization of the linked rate chart format eliminates the necessity for providing a separate weight header for each instance wherein there is a change in the character of the incremental dollar value. Thus, in effect, a new dollar header is provided without a new weight header.

A single postage computation routine is employed whether the computed postage is for use on a parcel having a domestic destination or an international destination. The postage computation routine is described with reference to FIGS. 18 through 21. In describing the routine, numerals are used to identify particular blocks or points in the routine. As a matter of convention, all such numerals are four digits in length. The first two digits identify the Figure in which the block or point is found. The last two digits identify a particular point or block within the Figure.

The postage computation routine is called only after an appropriate rate chart weight header has been identified. For parcels being mailed to domestic destination, the appropriate weight header is determined by keyboard entries specifying the class of service to be employed; e.g. United States Postal Service First/Priority mail, United Parcel Service Interstate mail, etc. The starting address of the appropriate rate chart is retrieved from a directory or lookup table when the keyboard is read. When a parcel is to be mailed using an international class of service, additional data processing steps must be carried out before an appropriate rate chart can be selected. These steps are described with reference to later Figures. However, for purposes of describing the postage computation routine, it will be assumed that an appropriate rate chart for the particular class of service has already been retrieved from memory.

When the postage computation routine is called, the initial step 1802 is to reset any weight chart error flags set during the previous postage computation process. The encoded scale weight is loaded into a predetermined random access memory location from which it may be accessed during processing. In step 1804, weight header bytes are copied into random access memory for use during further processing. A comparison 1806 is then made to determine whether the scale weight is less than the stop weight specified in the weight header. If the scale weight is not less than the stop weight, a further decision 1808 must be made as to whether the scale weight is equal to the stop weight. If the two weights are equal, a check 1810 is made as to whether the weight range includes the stop weight. This check is made by determining the binary value of B5 in WGT FLAG 3 as discussed earlier with reference to FIG. 13. If the scale weight does equal the stop weight and the weight range includes the stop weight, the program goes to a point 1812 which is also reached directly from decision block 1806 where the scale weight is less than the stop weight. If, however, decision blocks 1806 and 1808 taken in tandem show that the scale weight is neither less than nor equal to the stop weight or if decision blocks 1808 and 1810 taken in tandem indicate that the scale weight equals the stop weight but that the weight range does not extend to the stop weight, then the parcel weight clearly falls outside the permissible weight range. A check 1814 is then made as to whether the weight header section called is the last section of the rate chart. If it is, the only conclusion that can be drawn is that the parcel is too heavy to be mailed by the selected class of service. An overweight error flag is set (block 1816) and program control is returned to main program. The overweight error flag causes a visual error code to be displayed on the keyboard display.

If, however, decision block 1814 indicates that the last section of the rate chart has not been called, the address of the next section is generated using the address contained in the first weight header and the weight header information for the next section is loaded into memory. After the second weight header information is retrieved, the above-described steps are again performed to see whether the scale weight is within the second weight range. If it is not, a third weight header is accessed and the weight comparison steps are repeated. The sequence is reiterated until it is determined that the weight header for the correct weight range has been located.

Once weight header information for the right weight range has been retrieved, a check 1818 is made to determine whether WGT FLAG 1 in the header indicates the selected class of service is one which permits mailing of oversized parcels at special rates. If check 1818 indicates that the selected class of service does not allow mailing of oversized parcels, program control goes directly to a point 1902. If, however, the mailing of oversized parcels is permitted, program control goes to a decision block 1820 at which a check is made to see whether the physically oversize key of the keyboard is depressed. If not, program control goes directly to the point 1902. If the oversize key is set, it is then cleared and a check 1822 is made as to whether the scale weight is greater than the oversize default weight. If the scale weight is less than or equal to the oversize default weight, the stored weight value is increased to the default value since the postal regulations require that the postage be computed as if the parcel weight were equal to the default weight. The entire routine is then repeated beginning at decision block 1806 to locate the weight header for the range which includes the oversize default weight.

If check 1822 shows that the scale weight exceeds the oversize default weight, program control goes directly to point 1902. At this point, the next phase of the postage computation routine begins. During this phase, the parcel weight is broken down into a starting weight and a number of weight increments. At block 1904 predetermined memory locations, designated as SUM 0, SUM 1, SUM 2 and ADDCNT registers are initialized. The three SUM registers are initialized at the start weight specified in the applicable weight header with SUM 0 representing the fractional ounces term (if any) in the start weight, SUM 1 representing the ounces term of the start weight and SUM 2 representing the pounds term of the start weight. ADDCNT, which will eventually represent the total number of weight increments for the scale weight, is initially set to 0.

A determination 1906 is made as to whether the scale weight is less than the SUM weight. A positive answer on the first iteration of the loop indicates that parcel weight is below the start weight for the weight range although it is to be rounded up to the start weight in the normal computation process. For example, a parcel weighing 14 ounces is less than the nominal 1.0 pound starting weight for the priority section of a combined First/Priority mail rate structure. However, the priority section cover all parcels weighing more than 12 ounces and a 14 ounce parcel would be treated as if it weighed 1.0 pounds.

If block 1906 indicates that the scale weight is not less than the SUM weights, a determination 1908 is made as to whether the scale weight equals the SUM weights. If it does and WGT FLAG 3 of the weight header indicates that the incremental weight includes the upper limit (block 1910), the process of determining the number of weight increments is considered to be completed and program control goes to a branch 1912. If, however, the scale weight equals the SUM weights but the weight increment does not include the upper limit or if the scale weight does not equal the SUM weights (meaning that it exceeds the sum weights since block 1906 has already established that it is not less than the SUM weights, the program continues through block 1914 in which the first defined weight increment for the weight range is added to the SUM registers. The ADDCNT register is incremented by 1 in a step 1916 to indicate that a weight increment has been added to the SUM registers. If WGT FLAG 3 indicates that the weight chart is a linear one, decision block 1918 returns the program to point 1906. If, however, the weight chart is non-linear, the next weight increment value is retrieved (block 1920) before program control returns to point 1906.

The steps which begin with block 1906 and end with block 1920 are reiterated until a positive answer is obtained either at decision block 1906 or decision block 1910. During each iteration, the SUM register values are incremented by the amount of the appropriate weight increment while the ADDCNT register is incremented by 1. At point 1912, the contents of the ADDCNT registar represent the number of weight increments by which the parcel weight exceeds the start weight for the selected weight range. To leave this section of the routine, a check 1922 is made as to whether the weight chart is linear. If the weight chart is non-linear, a sequence of instructions is carried out (block 1924) to skip the remaining weight increments in the chart. If block 1922 indicates that the weight chart is linear, this sequence is bypassed with program control going directly to point 1926. A determination 1928 is made as to whether the selected rate chart section is one requiring a zone input. As indicated earlier, some rate structures are zone-independent. If the selected structure is one of these, the starting address for the appropriate dollar table is retrieved from the weight header in operation 1930.

If the chart is zone structured, however, a check must be made as to whether a valid zone number has entered and, if so, whether it is greater than the maximum permissible zone number specified in the weight header. If an invalid zone number has been entered or if an otherwise valid zone number exceeds the maximum number set in the header, zip or zone error flags are set to trigger an error display which will alert an operator to the problem.

If the valid zone number entered does not exceed the maximum permissible zone number, program control is transferred to a point 2002. At this point, the dollar table address for the specified zone is loaded and a determination 2004 is made as to whether there is an illegal zone entry in the address bytes. This check is needed since United Parcel Service does have illegal zone numbers. If an illegal zone entry is detected, zone error flags are set (block 2006) and control is returned to a main program. If the zone entry is legal in the address, a check 2008 is made as to whether the table format is a linked format. It will be noted that the program branch for a zone-independent rate chart converges with the zone-independent program at the input to block 2008. When the tables are presented in a linked format, a check 2010 is made as to whether the binary count in the first two bytes of the header of the first section is greater than the ADDCNT quantity. If this binary count, which represents the weight range for the selected section of the dollar table is less than the ADDCNT value, the appropriate section of the dollar table has yet to be reached. The section header binary count is subtracted from the ADDCNT quantity (block 2012), and a double byte address in the chart is accessed as shown in block 2014 to access the next section of the dollar table. Operations 2010, 2012 and 2014 are repeated until it is determined that the count in the section header is greater than the decremented ADDCNT quantity. At this point, the program will have located the proper section of the dollar table in the linked header. If the dollar table is not the last one in the chart, the remaining address bytes are skipped to reach a point 2102 in the program. If the dollar table section selected is the last section, there are no address bytes left to skip and program control bypasses this last operation. Point 2102 is reached directly from block 2008 if the latter block indicates that an unlinked table format has been employed.

At this point in the computation routine, sufficient rate data has been retrieved in the form of equation boundary conditions and instructions for generating a postage value format routine having various subroutines (equations). The process of actually computing the postage in accordance with the equation is started (block 2104) by zeroing $ SUM memory locations or registers, which represent tens of dollars, dollars, tens of cents, cents and fractions of cents. The $ SUM registers are then initialized (block 2106) to the base or starting postage amount specified in the dollar table header. The full ADDCNT quantity is decremented by one in operation 2108 and a check 2110 made as to whether the resulting value is negative. If not, the first postage increment specified in the table is added to the $ SUM registers in an operation 2112. If the chart is linear as specified by the $ FLAG byte, the equation for generation of the postage returns to the block 2108. If the chart is non-linear, the next postage increment in the table is called up (block 2114) before program control returns to block 2108.

The operations beginning with block 2108 are performed repeatedly with the ADDCNT value being decremented by one during each cycle while another postage increment is added to the $ SUM registers.

When decision block 2110 indicates that the result of the ADDCNT decrementing step is negative, meaning that all of the weight increments for the parcel weight have been taken into account, program control is transferred to a rounding subroutine (equation) shown only as a block 2116. The postage amount may be rounded off to the next higher rounding increment or rounded off to the nearest rounding increment in accordance with the microinstructions of the $ FLAG byte. When any necessary rounding operations have been performed, the calculator sets a flag (block 2118) to indicate to the system that the postage amount has been computed. The postage amount is loaded into a display buffer to provide a visual display for the benefit of the operator before program control is returned to a main program.

At this point, if the operator is satisfied with the displayed value, he can depress the Print key to cause the postage amount to be imprinted on a parcel or an adhesive-backed tape.

As has been indicated before, the postage computation routine described with reference to FIGS. 18 through 21 is employed to calculate postage for both domestic and international classes of service. When an international class of service is selected, additional pre-computation steps are carried out in order to take into account different weight limits or permissible modes of shipment in different countries. These additional steps are described with reference to FIGS. 22 through 30.

The international rate structure includes a directory table illustrated generally in FIG. 22. The first two bytes of the directory table include the address of a check sum location for the table. The third byte is a representation of the highest country code number used in the table. To simplify processing, different countries are identified by different three digit code numbers. In a preferred embodiment of the invention, there may be 254 different code numbers (000 through 253) available for identifying different countries. Use of all 254 available code numbers is not likely, however, so that a maximum code number less the highest available code (253) is specified. Nor is it likely that the list of country code numbers will remain static. New countries may be added to the list or existing countries may be deleted as a result of political alliance or military defeat. Because the realities of the situation, the international rate structure directory table includes a list of missing country code numbers, within the range limited by the maximum country code number entry.

For each of the five reognized classes of international mail service (letter class, parcel post, printed matter, book and small packet) the international rate structure directory table includes starting addresses for group and vector tables, which are employed to determine the appropriate rate chart for a particular country, and a chart descriptor byte, which selects one of two available types of rate chart address generating processes to be employed. The exact functions and contents of the group and vector tables and of the chart descriptor byte are discussed with reference to later Figures.

FIG. 23 is a more detailed representation of the type of information which is included in any of the class of service sections of the international directory table. Each class of service section includes ten successive bytes of information. The first five bytes relate to a surface mode shipment within a specific class of service while the second five bytes relate to air shipment of parcels within the same class of service. More particularly, the first two bytes of the first section form a two word starting address for the group table applicable to the surface shipment within a particular class. The third and fourth bytes in the first section form the starting address of a corresponding vector table. The fifth byte in the first section is a chart descriptor byte. The second section has the same format as the first section and includes group and vector table addresses and a chart descriptor byte relating to air shipment within the same class of service.

As indicated earlier, a user who selects an international class of service must specify through the keyboard whether air or surface shipment is to be used. The user must also specify the class of service as part of the four digit entry, the last three digits on which are the country code number for the country of destination.

The calculator responds to the depression of either the air or the surface key and the entry of a code number specifying a class of service to select the particular section of the directory table containing the starting addresses and chart descriptor byte for the selected mode of shipment and class of service. The routine for performing the selection process is described in detail later.

Figure 24:
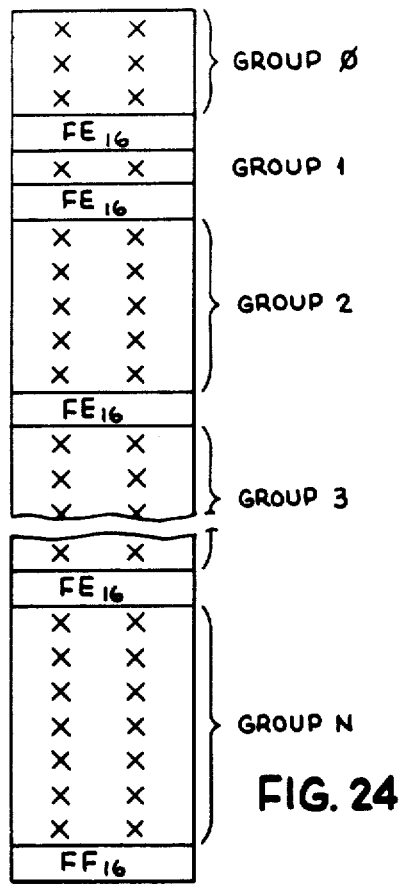
FIG. 24 represents the format of a group table used in generating an appropriate rate chart address in the course of computing international postage amounts.

Within each class of service, a number of different countries may share a common rate chart. The group table mentioned above is a table of country code numbers in which the various countries are grouped as a function of the rate chart which is applicable to them. FIG. 24 is a generalized representation of a group table. The number of countries within each group can vary although a group obviously has to have at least one country. Each group within the table consists of a listing of the country code numbers for the various countries which share the same rate chart for the selected class of service and selected mode of equipment. To separate one group from the next group, inter-group delimiter bytes are provided. In hexadecimal format, each such group delimited byte preferably is equal to FF$_{16}$.

For the five presently available classes of international postal service, each having two possible modes of shipment, there are ten group tables. To identify the last entry in each table, an end of table delimiter byte is provided. In a preferred embodiment, the end of table delimiter byte is equal to FF$_{16}$.

Each group table does not necessarily include an entry for every country. As will be explained later, a significant number of country code numbers can be omitted from the group table without altering the effectiveness of the calculator.

Figure 25:
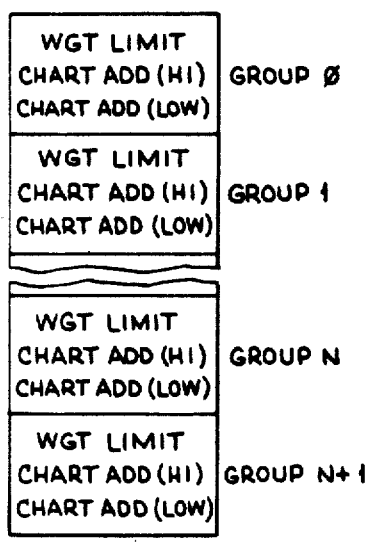
FIG. 25 represents the format of a type of vector table used in a normal approach to generation of rate chart addresses.

Group tables of the type illustrated in FIG. 24 are noramlly used in combination with vector tables of the type illustrated generally in FIG. 25 to obtain the actual starting address for an applicable rate chart. In a normal vector table, data is segregated by groups. Each vector table section consists of three successive data bytes. The first byte in each group contains two four bit words in hexadecimal format establishing a weight limit for the group and, thus, for the selected mode of shipment and class of service. The next two bytes in each vector section form a two byte starting address for the applicable rate chart. Since different countries may use the same rate chart structure but set different weight limits, different sections of the vector table may have different weight limit values but the same rate chart starting address.

Figure 26:
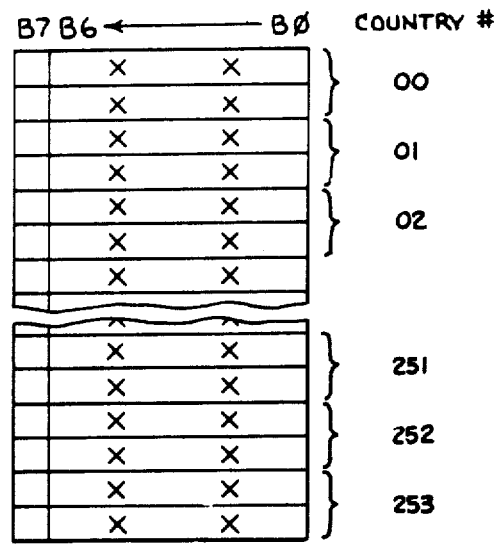
FIG. 26 represents the format of an alternative type of vector table used in a "forced" approach to generation of rate chart addresses.

The vector table described above is constructed on a premise that the same rate chart structures are applicable to more than one country. Under worst case conditions, each country might choose to adopt a unique rate structure for each different class of service and mode of shipment. A modified form of vector table is employed to derive the applicable rate chart addresses in such a situation. This table, to be described generally with reference to FIG. 26, is used in carrying out what has been referred to as the forced approach to rate chart address generation.

The modified vector table has a specific assigned two byte rate chart address for each of the countries to which a country code number has been assigned. In a preferred embodiment, up to 253 two byte addresses could be provided although the actual number of addresses is equal to the maximum country code number specified at the start of the international directory table. Each address consists of two sequential eight bit bytes with the assigned address position for the $N^{th}$ country code number being the $N^{th}+1$ position. Two or more countries which share the same rate chart will have identical addresses stored in their respective country code number positions.

Figure 30:
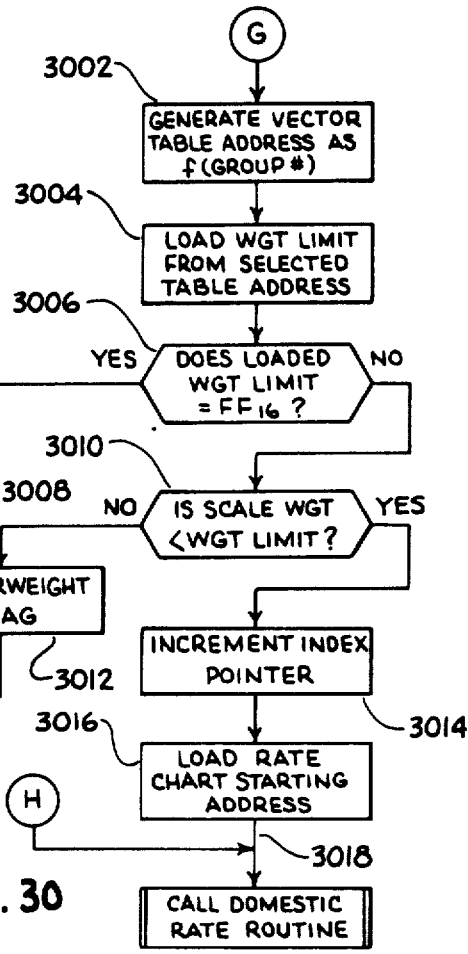
FIGS. 28 through 30, taken together, are a more detailed flow chart of the routine for selecting the appropriate rate chart during computation of international postage amounts.
Figure 27:
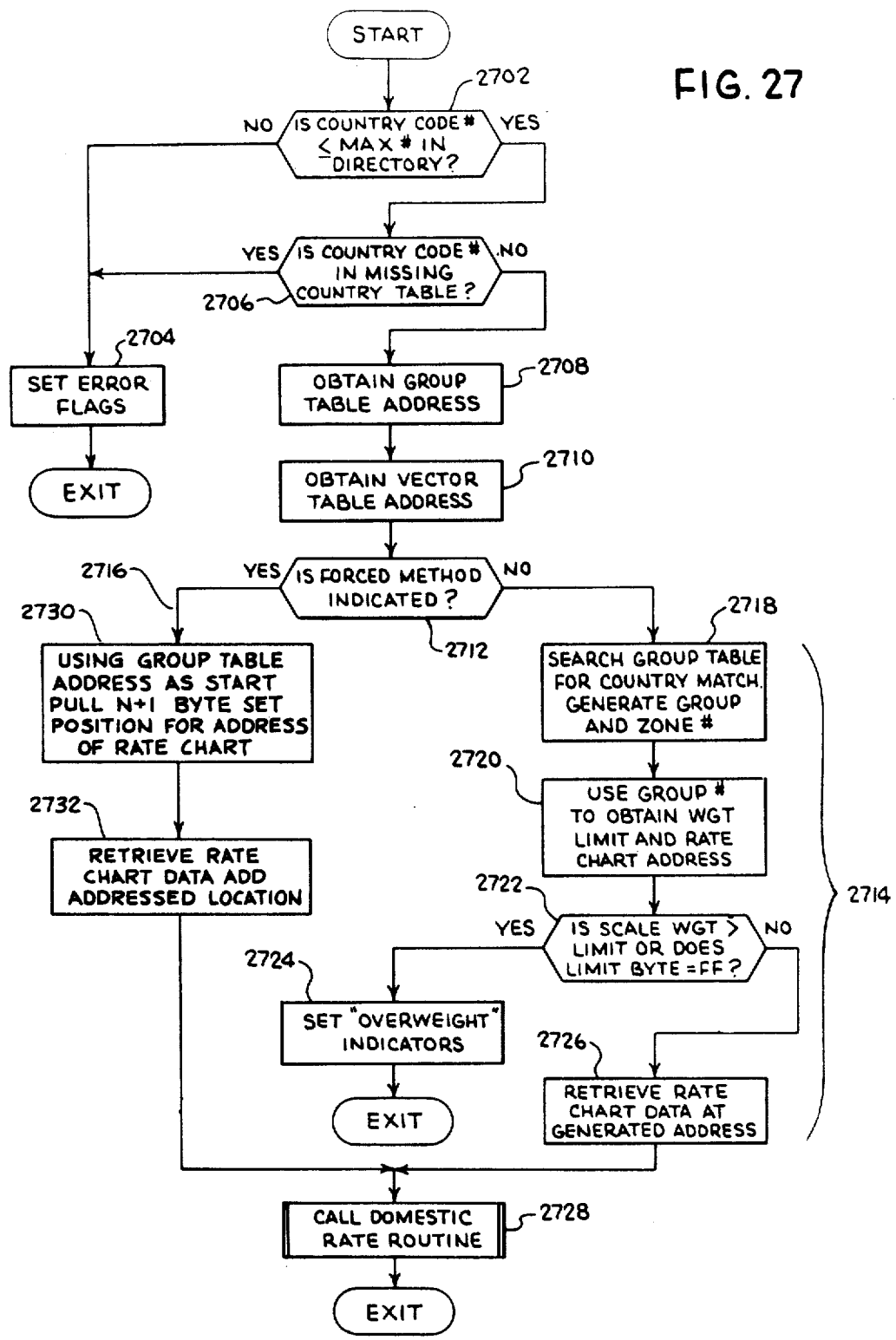
FIG. 27 is a simplified flow chart of the routine employed to select the proper rate chart for calculating international postage amounts.
Figure 28:
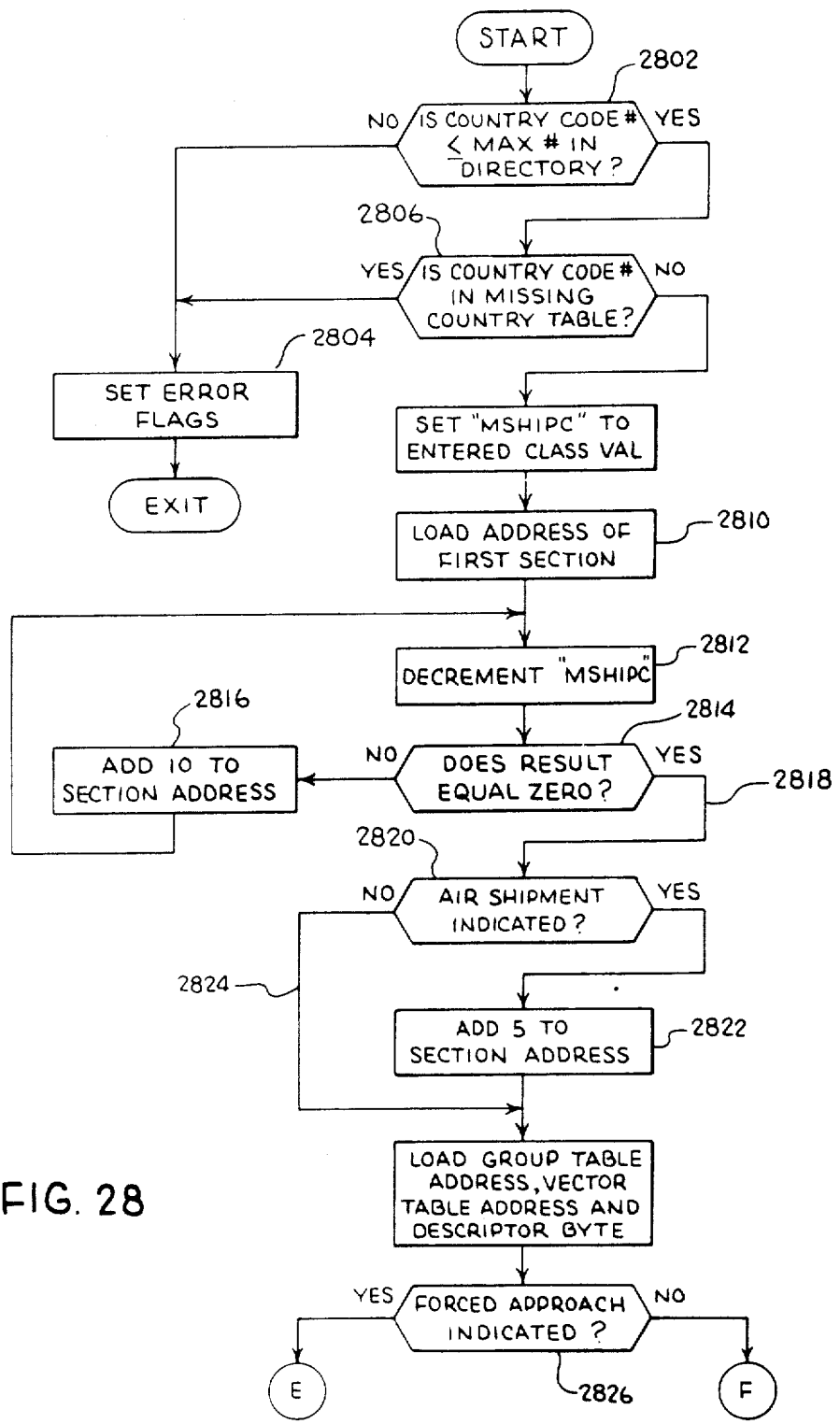
Figure 29:
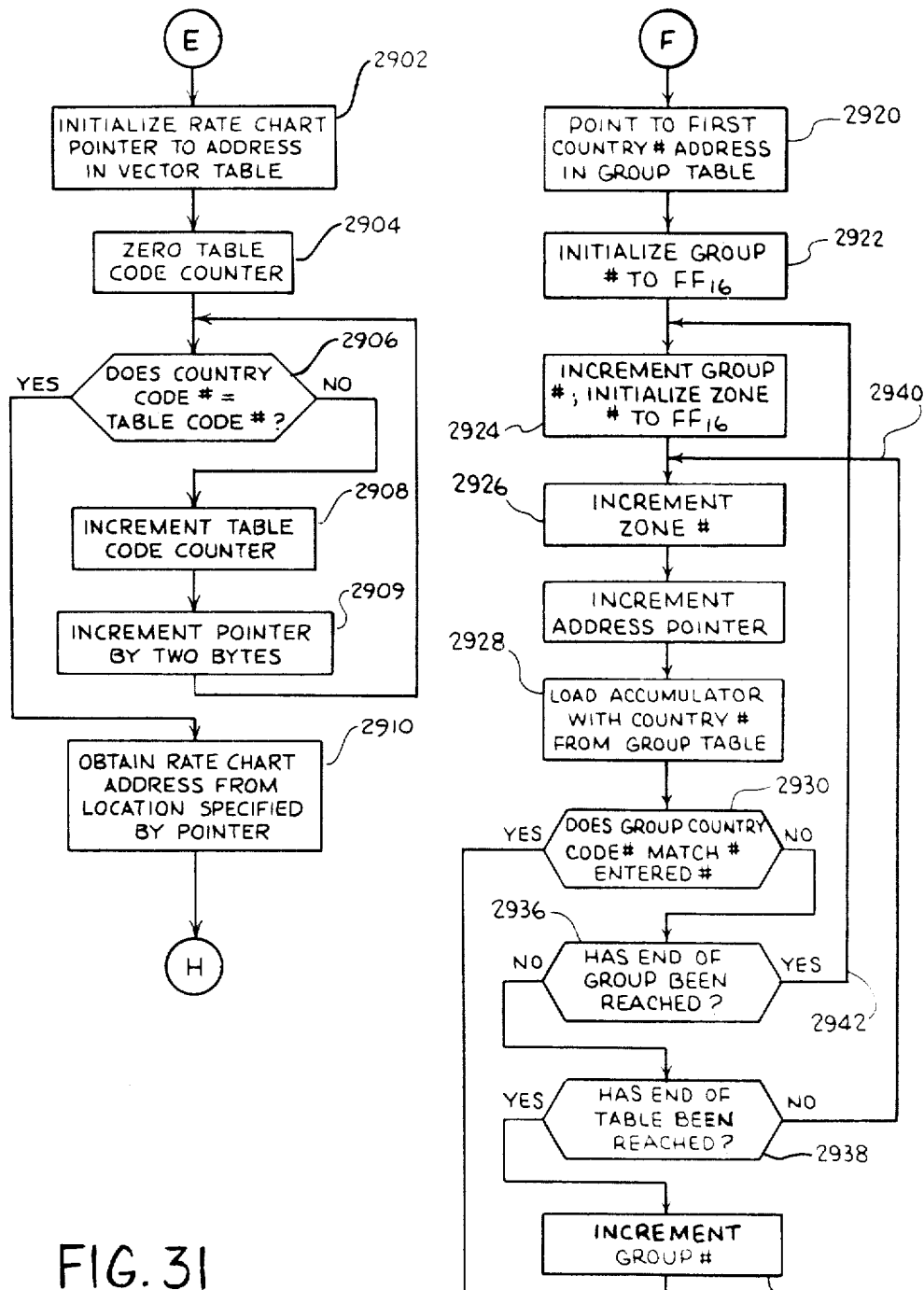

The function of the group and vector tables described above is to facilitate the generation of the starting address of a rate chart applicable to a particular country, class of service and mode of shipment. Once the appropriate rate chart has been addressed, the system employs the same postage computation routine as is used for determining domestic postage amounts. FIG. 27 is a flow chart describing the international postage computation routine in simplified fashion. FIGS. 28 through 30, taken together, comprise a more detailed flow chart of describing the international postage computation routine in simplified fashion. FIGS. 28 through 30, taken together, comprise a more detailed flow chart of the process.

Referring first to FIG. 27, an initial step 2702 is to determine whether the country code number entered through the keyboard is more than the maximum country code number specified in the international directory table. If the entered country code number is greater than the maximum allowable number, an error flag is set (block 2704) immediately and control returned to the main program. If the entered country code number is not more than the maximum permissible number, a second check 2706 is made as to whether the entered country code number is in the list of missing countries. If so, error flags are set. If not, the group table address is obtained (block 2708) as a function of country, class of service and mode of shipment. As indicated earlier, the class of service and country code are entered into the system in the form of a four digit number through the numerical entry keyboard. The mode of shipment (air or surface) is designated by depressing either the "international air" or "international surface" key on the keyboard. The appropriate vector table is accessed using the vector table address in the international directory table for the class of service and mode of shipment (block 2710).

At this point, the program can follow either of two branches depending on whether a check 2712 indicates that a normal address generation approach (2714) or a forced address generation approach (2716) is to be employed.

If the normal approach is to be employed, the accessed group table is searched (block 2718) until the table entry corresponding to the entered country code number is located. The group within which the selected country is found is then used to access the vector table (block 2720) for the selected class of service and mode of shipment. The vector table provides a maximum weight limit and the actual 16 bit address of the appropriate rate chart.

Before the rate chart is called, a check 2722 is made as to whether the scale weight exceeds the weight limit of whether the weight limit in the group table is set to default of FF$_{16}$ value. If the scale weight exceeds the permissible weight limit, an overweight indicator is set (block 2724) and program control is returned to a main program. If the weight limit byte in the group table is set to the default value, this indicates that the countries within the specified group do not have a mail service corresponding to the nominally selected class of service and mode of shipment. For example, Canada does not currently have an air parcel post class of service.

Assuming the scale weight is within the limit set in the vector table and that the class of service/mode of shipment is a valid one, rate chart data stored beginning at the address contained in the vector table is retrieved (block 2726) and the domestic postage computation or rate routine is called (block 2738) to calculate the appropriate postage before control is returned to a main program.

If the chart descriptor byte in the directory table entry has indicated that a forced approach was to be followed in generating the address to the rate chart, branch 2716 would have been followed. The modified vector table described with reference to FIG. 26 is accessed with the entered country code number as illustrated in block 2730 to obtain the rate chart address. As presently structured, the first stored two byte address is assigned to country number 0; therefore the address for the Nth country will be found at position N+1. The rate chart data stored at the designated address is retrieved (block 2732) and used in the postage computation routine.

From the foregoing, it can be seen that the only difference between the normal approach and the forced approach lies in the manner in which the address of the appropriate rate chart is obtained. Naturally, when the normal approach can be employed, much memory space is conserved. The actual rate chart data stored at any address will have the same format regardless of how that data is obtained.

A more detailed flow chart of the routine for obtaining rate chart addresses for international postage service will now be described with reference to FIGS. 28 through 30. Certain decision or operation blocks appear both in the general flow chart described with reference to FIG. 27 and the more detailed flow chart to be described. For example, the first step in both is to determine whether the entered country code number is greater than the maximum number specified in the directory. To maintain consistency as to the numbering system employed, such blocks are numbered in accordancee with the Figure in which they appear, notwithstanding they may also appear in other Figures. Thus, the decision block described above is identified as block 2802 in the more detailed flow chart. If the entered country code number is greater than the maximum permissible number or is included in the missing country table (block 2806), error flags are set (block 2804) before the program control is returned to a main program.

If the entered country code number is not greater than the permissible number and does not appear in the missing country table, a random access memory storage location designated MSHIPC is initialized to a number, e.g. within the range of 1 through 5, indicative of the class of service to be employed. For example, if the keyboard entry indicates that letter class is to be employed, MSHIPC is set to "1". The first data section of the directory table is addressed (block 2810) before the quantity MSHIPC is decremented by 1 (block 2812). If the decremented MSHIPC quantity does not equal zero (block 2814), the section address is incremented by 10 (block 2816) to move the memory pointer to the first memory location for data pertaining to the next class of service. The quantity 10 is added since each class of service is defined in the directory table by 10 successive bytes of information. For example, referring briefly to FIG. 22, if the result of operation 2814 indicated that MSHIPC was something other than zero, the memory pointer would be moved in operation 2816 from the first byte of the letter class section of the directory table to the first byte of the parcel post section. Operations 2812, 2814 and 2816 form a loop which is reiterated until MSHIPC is decremented to zero. The loop is exited at point 281, at which the memory pointer is set to the first byte of the data section pertaining to the selected class of service.

When the directory table section for the selected class of service has been located, a check 2820 is made as to whether keyboard entries indicate air or surface shipment. If air shipment is indicated, the memory pointer is incremented by 5 to move the pointer to the first entry in the second half of the selected directory table section. Referring briefly to FIG. 23, it will be recalled that the second half of each section contains data pertaining to the air mode of shipment for the selected class of service. If air shipment is not indicated, operation 2822 is bypassed through branch 2824, leaving the memory pointer at the first entry in the surface shipment subsection of the selected section. When the proper directory table subsection has been located, the group table address, vector table address and chart descriptor byte in that subsection are loaded into working memory and the chart descriptor byte is read (operation 2826) to determine whether a normal or a forced address approach is indicated for obtaining the rate chart address.

If a forced approach is to be employed, the program follows a branch beginning with an operation wherein a rate chart pointer is initialized at the address in the vector table as shown in a block 2902. Thereafter, a table code counter is zeroed as shown at block 2904 and a determination is made as to whether the entered country code number equal the table code number in the counter (block 2906). It should be appreciated that in the vector table for the forced approach successive two type addresses for the rate chart of each valid country are sequentially stored as illustrated in FIG. 26.

If the country code number in the counter is not equal to the country code number designated at the pointer storage location, the table code counter is incremented and the rate chart pointer is incremented (block 2909) to the next sequentially stored address position, i.e. incremented by two bytes, as shown in block 2908. Thereafter, decision block 2906 is reiterated with successive incremented code counter values until an equality between the incremented code counter value and the entered country code number is obtained. When a match is reached in a decision block 2906, the two byte rate chart address at the pointer is loaded as shown in a block 2910.

When the normal approach to rate chart address generation is employed, the first step is to direct a memory pointer to the first country code number location (block 2920) in the group table identified by the directory table entry for the selected class of service and selected mode of shipment. A Broup number counter is then initialized (block 2922) to a FF16 value. The group number counter is then incremented by 1 (block 2924) to effectively reset it to zero and a zone number counter is initialized to an FF16 value. The zone number counter is incremented (block 2926) to zero it. In the context of this approach, the term zone is used to refer to the position of a country code number within a particular group.

Initially, the memory pointer is at the country 000 address in the group table while both the group number counter and the zone number counter are at 0. The address pointer is incremented and the processor accumulator is loaded with the country code number from the addressed location in the group table (operation 2928). A decision (block 2930) is made as to whether the country code number loaded into the accumulator from the group table corresponds to the country code number entered through the keyboard. If there is a match, program control goes directly to a point 2932 via a branch 2934 since such a match indicates that the group including the selected country has already been located. If, however, the country code number obtained from the table does not match the entered country code number, a check (2936) is made as to whether the end of the group has been reached. As indicated earlier, the end of each group is recognized as specific delimiter value, preferably FF16.

If the sepcific delimiter value is not sensed in operation 2936, a further determination 2938 is made as to whether the end of the table (denoted by an FF16 entry) has been reached. If neither the end of the group nor the end of the table has been reached, program control returns to operation 2926 via branch 2940. The zone number counter is incremented by 1 and the address pointer is incremented by 1 to point to the next country code number within the same group. The new country code number obtained from the group table is then compared to the entered country code number. When a match is detected, program control jumps directly to output point 2932 via branch 2934. But until a match is detected, or until the end of a group is reached, the program loop beginning with operation 2926 and ending with operation 2938 is repeated with the zone number counter and address pointer being incremented once per cycle and with one comparison per cycle being made between the country code number from the group table and the entered country code number.

When the end of a group entry (FF16) is sensed, the program branches back to operation 2924 through branch 2942. The group number counter is then incremented by 1 to indicate that the next group has been reached and the zone number counter is again initialized. The second group and, if necessary, subsequent groups are searched sequentially until a match is detected between the country code number retrieved from the group table and the entered country code number. If no match is detected before the end of table delimiter (FF16) is detected, this is taken to be an indication that the selected country lies in a last group of countries not even listed in the group table. Under these conditions, the group number counter is incremented (operation 2944) before the program reaches exit point 2932. By setting the table up in this manner, unnecessary searching of country code numbers is avoided. If the country code number entered through the keyboard is a valid code number but has not been found during the search of all groups preceding the FF16 delimiter the assumption is that the country code number lies within the last group. A search through the last group is not necessary. Because the memory space normally required to list the last group of countries is not needed, the last group should contain the largest number of countries.

Using the group number obtained from the above-identified steps and the starting address for the vector table appropriate to the class of service and mode of shipment, the specific vector table address for the generated group number is itself generated in an operation 3002. The weight limit byte stored at the selected vector table address is loaded into working storage (operation 3004) and a check 3006 is made as to whether the weight limit byte is equal to FF16. The FF16 value indicates that there is no valid postal service for the nominally selected class of service and mode of shipment. An error flag is set (operation 3008) and control is returned to a main program. If the weight limit byte is not equal to FF16 a second check 3010 is made as to whether the scale weight is more than the weight limit specified by the byte. If the scale weight is greater than the specified weight, an overweight flag is set (block 3012) before the routine is exited.

However, if the scale weight is within the specified weight limit, an index pointer is incremented (operation 3014) to point to the rate chart starting address specified in the vector table. The rate chart starting address is loaded into working memory (block 3016) and the domestic postage computation routine is called.

It will be noted that where the forced address generation approach is used, program control jumps directly from operation 2910 to the point 3018 at which the domestic postage computation routine is called. While it might appear that use of the forced approach is actually preferable since fewer program operations are to be performed, this is not necessarily the case since a considerably greater amount of memory is required to store separate rate chart addresses for each country. The normal approach, however, is premised upon present international mail rates wherein groups of countries share the same rate chart. Thus, such countries are grouped together and treated the same which reduces the memory space.

Figure 31:
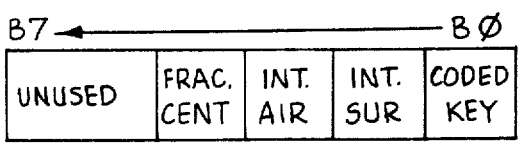
FIG. 31 is a schematic representation of a definition byte for a rate chart structure.

As indicated above a need has recently been found to exist for a capability to handle postage values expressed in terms of fractions of a cent. In a preferred embodiment of the subject invention this capability has been added to the method for determining weights described above. Additional information is incorporated in each rate chart structure. This information is encoded in a special definition bytes, shown in FIG. 31, one of which is associated which each rate chart structure and is read by system processor 10 when that rate chart structure is first accessed. B0 defines the rate chart as a "coded key" rate chart (i.e., actually a plurality of rate charts, a particular one of which will be selected in accordance with a later entered numeric code) B1 defines the rate chart structure as an International Surface rate chart and B2 defines the rate chart structure as an International Air Mail rate chart. Ready access to this information has proved useful in the determination of postage values, allowing the processor to be programmed handle rate chart structures defined by this information differently when necessary without the need for completely separate programming. However a more complete description of the way the information in bits B0-B2 is used is not believed necessary to an understanding of the subject invention and will not be discussed further.

Bit B3, when set, defines the rate chart structure as a fractional cent rate chart. Data is stored for both fractional cent and whole cent rates in an identical fashion. Thus the same programming can be used to determine postage values for either type of rate chart structure. However when bit B3 is set system processor 10 treats the determined postage value as representing a postage value reduced by a factor of ten. Thus, in accordance with the subject invention, dollar/numers display 61 in FIG. 6 includes two decimal point indicators 63a and 63b which are set by processor 10 in accordance with the value of bit B3. Similarly the postage value is output to Printing Subsystem Processor 222 with additional information defining the decimal point location in the manner described above. And of course the postage value is output to the periphial subsystem processor 22 in accordance with the value of B3 so that any accounting system included in the system receives the proper postage values.

The system has been described thus far without reference to specific processors or specific programming languages since different commercially-available processors and different programming languages compatible with the particular processors might be used.

In a preferred embodiment, the systems central processing unit 140 may be a PPS-4/1 one chip microcomputer, MM-76 series. The communications controller/processor 64 is an A-79 processor chip. The scale subsystem processor and the peripheral subsystem processor are preferably MM-78 Series microcomputers while the postage printer subsystem processor is preferably a MM-77 Series microcomputer. All of the foregoing microcomputer products are manufactured by Rockwell International Corporation of Anaheim, Calif.

Instruction Sets for programming these devices are disclosed in Product Description, MM-76 Series, March 1977, Revision: 3, 29410N41, and Product Description, MM-77 and MM-78, March 1977, Revision: 3, 29410N42, both available from Rockwell International Corp.

Given the rate chart formats described herein, the actual rate charts can be constructed using data published by the United States Postal Service and the United Parcel Service.

While there has been described what is considered to be a preferred embodiment of the invention, variations and modifications therein will occur to those skilled in the art when they become acquainted with the basic concepts of the invention. Particularly, it is within the contemplation of the present invention to use additional bits in the definition byte shown in FIG. 31 to extend the range through which the decimal point in the postal value may be shifted. Therefore, it is intended that the appended claims shall be construed to include the preferred embodiment and all such variations and modifications as fall within the true spirit and scope of the invention.

What is claimed is:

1. An apparatus for determining postage values for items to be mailed, comprising:
    (a) means for determining the weights of said items;
    (b) data entry means for entering data necessary to determine the postage applicable to said items, said data including data defining the class of service applicable to each of said items;
    (c) processor means connected to said weight determining means and said data entry means for determining the postage value applicable to each of said items, said processing means further comprising memory means for storing tables of data defining applicable postage rates, selection among said tables being made in terms of said determined weights and said entered data, each of said tables corresponding to a particular one of said classes of service, and each of said tables including additional data more precisely defining said postage rate defining data in that table, and said additional data in each of said tables including data defining the decimal point location in the postage values determined from that table; and,
    (d) said processor means responding to said determined weights and said entered data to select and output the appropriate postage value from said tables for each of said items, the decimal point location in said output values being determined in accordance with said additional data.

2. An apparatus as described in claim 1 further comprising display means for displaying said selected postage value, the decimal point location in said displayed value being determined in accordance with said additional information.

3. A mailing system comprising:
    (a) an apparatus as described in claim 1;
    (b) printing means connected to said apparatus for printing said selected postage values, the decimal point location in said printed value being determined in accordance with said additional data.

4. A mailing system comprising:
    (a) an apparatus as described in claim 2;
    (b) printing means connected to said apparatus for printing said selected postage values, the decimal point location in said printed value being determined in accordance with said additional data.

5. A mailing system as described in claim 3 further comprising a first printing means for printing postage values expressed in fractions of a cent and a second printing means for printing postage values expressed in whole cents, said apparatus, selecting in accordance with said additional information, said first printing means to print postage values expressed in fractions of a cent and said second printing means for printing postage values expressed in whole cents.

6. A mailing system as described in claim 4 further comprising a first printing means for printing postage values expressed in fractions of a cent and a second printing means for printing postage values expressed in whole cents, said apparatus selecting, in accordance with said additional information, said first printing means to print postage values expressed in fractions of a cent and said second printing means for printing postage values expressed in whole cents.

7. A mailing system as described in claim 3 wherein said apparatus shifts, in accordance with said additional data, the positions with respect to the decimal point of the digits expressing said postage value prior to printing said postage value.

8. A mailing system as described in claim 4 wherein said apparatus shifts, in accordance with said additional data, the positions with respect to the decimal point of the digits expressing said postage value prior to printing said postage value.

9. A mailing system as described in claim 3 wherein said printing means comprises an electronic postage meter responsive to said apparatus for positioning the decimal point in said printed postage value in accordance with said additional information.

10. A mailing system as described in claim 4 wherein said printing means comprises an electronic postage meter responsive to said apparatus for positioning the decimal point in said printed postage value in accordance with said additional information.

11. A method for applying appropriate postage values to items to be mailed comprising the steps of:
    (a) determining the weight of one of said items;

(b) inputting said determined weight to a data processor;
(c) inputting data necessary to determine the postage value applicable to said item to said data processor, said data including data defining the class of postal service applicable to said item, said processor then;
(d) identifying a table of data for determining postage rates corrresponding to said applicable class of service;
(e) retrieving additional data further defining said rate defining data, said additional data including data defining the decimal point location in postage values determined in accordance with said table;
(f) determining the postage value applicable to said item in accordance with said weight, said entered data and said identified table, the decimal point location in said determined postage value being defined by said additional data; and
(g) outputting said determined postage value to printing means for printing postage indicia, whereby the appropriate postage value is applied to said item.

12. The method of claim 11 further comprising the step of displaying said determined postage value, the decimal position in said displayed value being determined in accordance with said additional information.

13. The method of claim 11 further comprising the step of outputting said determined postage value to a postage accounting subsystem, the decimal position in said output value being determined in accordance with said additional information.

* * * * *